(12) United States Patent
Nara et al.

(10) Patent No.: US 10,386,576 B2
(45) Date of Patent: Aug. 20, 2019

(54) OPTICAL WAVEGUIDE CIRCUIT HAVING IDENTICAL POLARIZATION-CANCELLING S-SHAPED CURVES

(71) Applicant: FURUKAWA ELECTRIC CO., LTD, Tokyo (JP)

(72) Inventors: Kazutaka Nara, Tokyo (JP); Takashi Inoue, Tokyo (JP); Noritaka Matsubara, Tokyo (JP); Hiroshi Kawashima, Tokyo (JP)

(73) Assignee: FURUKAWA ELECTRIC CO., LTD, Tokyo (JP)

( * ) Notice: Subject to any disclaimer, the term of this patent is extended or adjusted under 35 U.S.C. 154(b) by 141 days.

(21) Appl. No.: 13/869,657

(22) Filed: Apr. 24, 2013

(65) Prior Publication Data
US 2013/0236136 A1  Sep. 12, 2013

Related U.S. Application Data

(63) Continuation of application No. PCT/JP2012/056584, filed on Mar. 14, 2012.

(30) Foreign Application Priority Data

Mar. 28, 2011 (JP) .................... 2011-070909

(51) Int. Cl.
*G02B 6/126* (2006.01)
*G02F 1/01* (2006.01)
(Continued)

(52) U.S. Cl.
CPC .......... *G02B 6/126* (2013.01); *G02B 6/29355* (2013.01); *G02F 1/0136* (2013.01); *G02F 2001/212* (2013.01); *G02F 2201/066* (2013.01)

(58) Field of Classification Search
None
See application file for complete search history.

(56) References Cited

U.S. PATENT DOCUMENTS 4,762,381 A * 8/1988 Uemiya et al. .................. 385/88
4,900,112 A * 2/1990 Kawachi et al. ............... 385/14
(Continued)

FOREIGN PATENT DOCUMENTS

| JP | 07-092326 | 4/1995 |
|---|---|---|
| JP | 08-278422 | 10/1996 |

(Continued)

OTHER PUBLICATIONS

International Search Report dated Jun. 19, 2012 for PCT/JP2012/056584 filed Mar. 14, 2012 with English Translation.
(Continued)

*Primary Examiner* — Andrew Jordan
(74) *Attorney, Agent, or Firm* — Oblon, McClelland, Maier & Neustadt, L.L.P.

(57) ABSTRACT

An optical waveguide circuit includes a polarization beam splitter connecting to a first input optical waveguide; an optical interference element receiving one of orthogonally polarization-split lights of a first light from the polarization beam splitter, and one of orthogonally-polarized lights from a second light input to a second input optical waveguide, the optical interference element causing interference therebetween; a first connection optical waveguide connecting the polarization beam splitter and the optical interference element; and a second connection optical waveguide connecting the second input optical waveguide and the optical interference element. The first and the second input optical waveguides have a straight-line shape or an S-shape including a first bending portion and a second bending portion to cancel the polarization-rotation of light taking place in the first bending portion. The polarization beam splitter, the first (Continued)

and the second connection optical waveguides, and the optical interference element are arranged in an S-shape.

16 Claims, 15 Drawing Sheets

(51) Int. Cl.
 *G02B 6/293* (2006.01)
 *G02F 1/21* (2006.01)

(56) References Cited

U.S. PATENT DOCUMENTS

| | | | |
|---|---|---|---|
| 4,978,188 A * | 12/1990 | Kawachi et al. | 385/130 |
| 5,694,496 A | 12/1997 | Ando et al. | |
| 5,901,259 A | 5/1999 | Ando et al. | |
| 6,072,920 A | 6/2000 | Ando et al. | |
| 6,115,514 A | 9/2000 | Ando et al. | |
| 6,898,345 B2 * | 5/2005 | Okamoto et al. | 385/24 |
| 6,965,717 B1 * | 11/2005 | Tabuchi | G02B 6/12019 359/565 |
| 7,068,864 B2 * | 6/2006 | Hanashima et al. | 385/6 |
| 7,492,983 B2 * | 2/2009 | Matsubara | G02B 6/12007 385/14 |
| 8,401,351 B2 * | 3/2013 | Inoue et al. | 385/45 |
| 8,548,333 B2 * | 10/2013 | Nagarajan | H04B 10/40 398/138 |
| 8,861,984 B2 * | 10/2014 | Painchaud | H04B 10/612 398/202 |
| 8,873,899 B2 * | 10/2014 | Anderson | G02B 6/27 385/11 |
| 9,329,344 B2 * | 5/2016 | Anderson | G02B 6/27 |
| 9,335,472 B2 * | 5/2016 | Oka | G02B 6/1228 |
| 10,014,953 B2 * | 7/2018 | Ogawa | G02B 6/125 |
| 2002/0181870 A1 * | 12/2002 | Inoue et al. | 385/37 |
| 2003/0002127 A1 * | 1/2003 | George | 359/246 |
| 2003/0185512 A1 * | 10/2003 | Okamoto et al. | 385/37 |
| 2004/0067023 A1 * | 4/2004 | Hanashima et al. | 385/43 |
| 2004/0141677 A1 * | 7/2004 | Hanashima et al. | 385/14 |
| 2008/0031566 A1 * | 2/2008 | Matsubara | G02B 6/12007 385/14 |
| 2011/0019961 A1 | 1/2011 | Yamazaki | |
| 2011/0243556 A1 * | 10/2011 | Nagarajan | H04B 10/40 398/43 |
| 2012/0002971 A1 * | 1/2012 | Doerr | G02B 6/124 398/115 |
| 2012/0207474 A1 | 8/2012 | Inoue et al. | |
| 2012/0224812 A1 * | 9/2012 | Inoue et al. | 385/42 |
| 2013/0188971 A1 * | 7/2013 | Painchaud | H04B 10/612 398/214 |
| 2013/0236136 A1 * | 9/2013 | Nara et al. | 385/11 |
| 2016/0191162 A1 * | 6/2016 | Kim | H04B 10/2569 398/29 |
| 2016/0327738 A1 * | 11/2016 | Doerr | G02F 1/011 |
| 2018/0136392 A1 * | 5/2018 | Nagashima | G02B 6/136 |
| 2019/0094463 A1 * | 3/2019 | Hasegawa | G02B 6/126 |

FOREIGN PATENT DOCUMENTS

| | | |
|---|---|---|
| JP | 2002-122895 | 4/2002 |
| JP | 2003-004959 | 1/2003 |
| JP | 2011-027773 | 2/2011 |
| WO | 2011-027895 A1 | 3/2011 |

OTHER PUBLICATIONS

International Written Opinion dated Jun. 19, 2012 for PCT/JP2012/056584 filed Mar. 14, 2012.

Inoue, T. et al., Double-Pass PBS-Integrated Coherent Mixer Using Silica-based PLC, Optical Fiber Communication (OFC), collocated National Fiber Optic Engineers Conference (NFOEC), 2010 Conference on OFC/NFOEC, Mar. 25, 2010, OThB2.pdf.

Takashi Inoue et al., "Development of PBS-Integrated Coherent Mixer Using Silica-Based Planar Lightwave Circuit", Furukawa Electric Review, Feb. 2011, No. 127, pp. 11 to 16.

Sakamaki et al., "One-chip integrated dual polarization optical hybrid using silica-based planar lightwave circuit technology" Proc. of ECOC2009, paper 2.2.4. Sep. 20-24, 2009, Vienna, Austria.

Sakamaki et al., "Dual polarization optical hybrid using silica-based planar lightwave circuit technology for digital coherent receiver", Electronics Letters, vol. 46 No. 1, p. 58-59. Jan. 7, 2010.

\* cited by examiner

OPTICAL WAVEGUIDE CIRCUIT HAVING IDENTICAL POLARIZATION-CANCELLING S-SHAPED CURVES

CROSS-REFERENCE TO RELATED APPLICATIONS

This application is a continuation of PCT International Application No. PCT/JP2012/56584 filed on Mar. 14, 2012 which claims the benefit of priority from the prior Japanese Patent Applications No. 2011-70909, filed on Mar. 28, 2011; the entire contents of which are incorporated herein by reference.

BACKGROUND OF THE INVENTION

1. Field of the Disclosure

The present invention relates to an optical waveguide circuit.

2. Description of the Related Art

Quadrature phase shift keying method is widely used as typical and practical coherent modulation methods. DP-QPSK (DP-QPSK: Dual Polarization Quadrature Phase Shift Keying) method in which Quadrature phase shift keying method and a polarization-multiplexing technique are combined, is a modulation method that can enhance frequency usage efficiency.

When the coherent modulation method is used, an optical interference element called a 90-degree hybrid element is used on a receiving side, and the element mixes a local oscillation (LO) light and a transmitted signal light to cause interference therebetween. Thereafter, a balanced-photo detector (B-PD) receives the interfering light output from the 90-degree hybrid element and splits an I channel and a Q channel of a modulated signal. As a result, an electrical signal can be taken out. When DP-QPSK method is used, a polarization beam splitter (PBS) is used on the receiving side, for example, and the polarization beam splitter polarization-splits the polarization-multiplexed two polarized signal light components. Thereafter, the respective polarized signal light components output from the polarization beam splitter are input to the 90-degree hybrid element, in which the polarized signal light components are mixed with the LO light.

When the polarization-multiplexing technique such as DP-QPSK method is used, for example, a method (polarization-multiplexed digital coherent transmission method) is proposed in which polarization inverse-multiplexing, estimation of a relative phase difference between the signal light and the LO light, dispersion compensation, error correction, and the like are performed by digital signal processing of the electrical signal output from the B-PD. The polarization-multiplexed digital coherent transmission method is very promising as a technique that can achieve high capacity optical transmission because the method extremely simplifies the optical signal processing and can increase receiving accuracy.

An optical waveguide circuit is disclosed in which polarization beam splitters and 90-degree hybrid elements are integrated using a planar lightwave circuit (PLC) technology. Hereinafter, such an optical waveguide circuit is described properly as a PBS-integrated coherent mixer (Sakamaki et al., "One-chip integrated dual polarization optical hybrid using silica-based planar lightwave circuit technology" Proc. of ECOC2009, paper 2.2.4., and Sakamaki et al., "Dual polarization optical hybrid using silica-based planar lightwave circuit technology for digital coherent receiver", Electronics Letters 7 Jan. 2010 vol. 46 No. 1, p. 58.).

SUMMARY OF THE INVENTION

It is an object of the present invention to at least partially solve the problems in the conventional technology.

According to an aspect of the present invention, there is provided an optical waveguide circuit includes a first and second input optical waveguides to which a first light and a second light are input, respectively; a first polarization beam splitter that connects to the first input optical waveguide; an optical interference element that receives one of two polarized light components that are output from the first polarization beam splitter after the first light is polarization-split by the first polarization beam splitter and orthogonal to each other, and one of two polarized light components that are produced from the second light and orthogonal to each other, the optical interference element causing interference between the input two light components; a first connection optical waveguide that connects the first polarization beam splitter and the optical interference element; and a second connection optical waveguide that connects the second input optical waveguide and the optical interference element. The first and the second input optical waveguides have an approximately straight line shape or an S-shape including a first bending portion having a predetermined curvature radius and a predetermined angle of an arc and a second bending portion having a curvature radius and an angle of an arc set so as to cancel rotation of a polarization surface of light taking place in the first bending portion. The first polarization beam splitter, the first and the second connection optical waveguides, and the optical interference element are arranged in an S-shape.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE INVENTION

Figure 1:
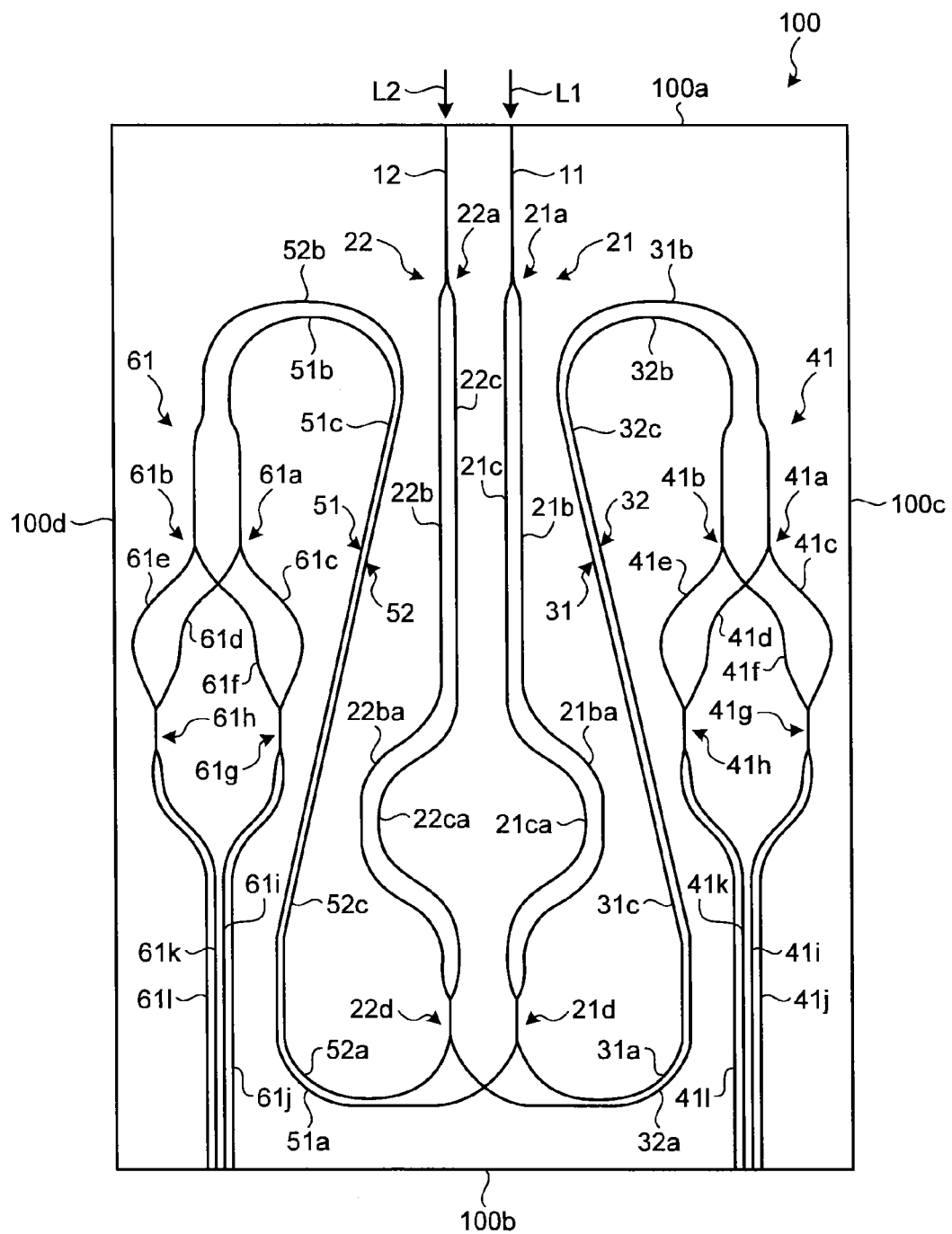
FIG. 1 is a schematic plan view illustrating an optical waveguide circuit according to a first embodiment.

Embodiments of an optical waveguide circuit according to the present invention are described in detail below with reference to the accompanying drawings. The embodiments do not limit the present invention. In the drawings, the same or corresponding components are labeled with the same reference numerals. In addition, the drawings are schematic and thus it is noted that relationships between dimensions of the components and ratios between the components may differ from those of the actual components, for example. Furthermore, the relationships and ratios between the dimensions may differ from each other among the drawings.

The optical waveguide circuit including a plurality of optical circuit elements such as the PBS-integrated coherent mixer is required to have a shape which is compact and easy to handle.

As a result of intensive examinations of the inventors, it was founded that a problem arises in that a light output intensity is sometimes unstable in an optical waveguide circuit including a polarization beam splitter such as the PBS-integrated coherent mixer.

An optical waveguide circuit according to the following embodiments can have a shape which is compact and easy to handle and a stable light output intensity.

First, an optical waveguide circuit according to a first embodiment of the present invention is described. The optical waveguide circuit according to the first embodiment is a PLC based optical waveguide circuit that can be used as a PBS-integrated coherent mixer and is made of silica based glass material.

FIG. 1 is a schematic plan view of the optical waveguide circuit according to the first embodiment. As illustrated in FIG. 1, an optical waveguide circuit 100 includes input optical waveguides 11 and 12 serving as first and second input optical waveguides, polarization beam splitters 21 and 22 serving as first and second polarization beam splitters, connection optical waveguides 31 and 32 serving as first and second connection optical waveguides, a 90-degree hybrid element 41 serving as an optical interference element, connection optical waveguides 51 and 52 serving as another first and second connection optical waveguides, and a 90-degree hybrid element 61 serving as another optical interference element.

The input optical waveguides 11 and 12 are disposed on a light input edge face 100a side and respectively formed in an approximately straight line manner toward a light output edge face 100b side.

The polarization beam splitter 21 includes a Y-branch optical waveguide 21a connecting to the input optical waveguide 11, arm optical waveguides 21b and 21c connecting to the Y-branch optical waveguide 21a, and a 3-dB coupler 21d that is a directional coupler and connects to the arm optical waveguides 21b and 21c. The polarization beam splitter 21 has a structure of a Mach-Zehnder type interferometer (MZI).

The lengths and birefringences of the arm optical waveguides 21b and 21c are respectively set such that the arm optical waveguides 21b and 21c have optical path lengths, at a certain wavelength, achieving an interference performance by which TM polarized light (polarization perpendicular to a substrate surface on which the optical waveguide circuit 100 is formed) is output from one output port of the 3-dB coupler 21d at approximately 100% while TE polarized light (polarization in parallel with the substrate surface) is output from the other output port of the 3-dB coupler 21d at approximately 100%. As a result, the polarization beam splitter 21 polarization-splits light input from an input port of the Y-branch optical waveguide 21a into TE polarized light and TM polarized light, and outputs each polarized light from the respective output ports of the 3-dB coupler 21d.

The polarization beam splitter 22 includes a Y-branch optical waveguide 22a connecting to the input optical waveguide 12, arm optical waveguides 22b and 22c connecting to the Y-branch optical waveguide 22a, and a 3-dB coupler 22d that is a directional coupler and connects to the arm optical waveguides 22b and 22c. The polarization beam splitter 22 also has the structure of the MZI type interferometer.

The lengths and birefringences of the arm optical waveguides 22b and 22c are also respectively set such that the arm optical waveguides 22b and 22c have optical path lengths, at a certain wavelength, achieving an interference performance by which TM polarized light is output from one output port of the 3-dB coupler 22d at approximately 100% while TE polarized light is output from the other output port of the 3-dB coupler 22d at approximately 100%. As a result, the polarization beam splitter 22 polarization-splits light input from an input port of the Y-branch optical waveguide 22a into TE polarized light and TM polarized light, produces two polarized light components orthogonal to each other, and outputs each polarized light from the respective output ports of the 3-dB coupler 22d.

The polarization beam splitters 21 and 22 are formed in such a manner that they are respectively arranged from the light input edge face 100a toward the light output edge face 100b and are approximately in parallel with each other. The arm optical waveguides 21b, 21c, 22b, and 22c have straight portions and bending portions 21ba, 21ca, 22ba, and 22ca, respectively, continuing from the respective straight portions. The presence of such bending portions enables the polarization beam splitters 21 and 22 to be arranged in a small space in a length direction, which is a direction from the light input edge face 100a toward the light output edge face 100b.

The connection optical waveguide 31 includes bending portions 31a and 31b, and a straight portion 31c connecting the bending portions 31a and 31b, and has an S-shape as a whole. The bending portion 31a connects to the 3-dB coupler 21d of the polarization beam splitter 21. The bending portion 31b connects to the 90-degree hybrid element 41.

Likewise, the connection optical waveguide 32 includes bending portions 32a and 32b, and a straight portion 32c connecting the bending portions 32a and 32b. The bending portion 32a connects to the 3-dB coupler 22d of the polarization beam splitter 22. The bending portion 32b connects to the 90-degree hybrid element 41. That is, the connection optical waveguide 32 couples the input optical waveguide 12 and the 90-degree hybrid element 41 with the polarization beam splitter 22 interposed therebetween.

The 90-degree hybrid element 41 includes a Y-branch optical waveguide 41a connecting to the connection optical waveguide 31, a Y-branch optical waveguide 41b connecting to the connection optical waveguide 32, arm optical waveguides 41c and 41d connecting to the Y-branch optical waveguide 41a, arm optical waveguides 41e and 41f connecting to the Y-branch optical waveguide 41b, a 3-dB coupler 41g that is a directional coupler and connects to the arm optical waveguides 41c and 41f, a 3-dB coupler 41h that is a directional coupler and connects to the arm optical waveguides 41d and 41e, output optical waveguides 41i and 41j connecting to the 3-dB coupler 41g, and output optical waveguides 41k and 41l connecting to the 3-dB coupler 41h. The 90-degree hybrid element 41 is formed in such an approximately straight line manner that extends from the light input edge face 100a side toward the light output edge face 100b, and the output optical waveguides 41i, 41j, 41k, and 41l reach the light output edge face 100b.

The arm optical waveguides 41c and 41d have an identical optical path length. The optical path length of the arm optical waveguide 41e and the optical path length of the arm optical waveguide 41f are set such that the optical path difference is 90 degrees in terms of phase of light. For example, the optical path length of the arm optical waveguide 41e is set to be shorter than the optical path length of each of the arm optical waveguides 41c and 41d by $\pi/4$ radian (45 degrees) in terms of phase of light, while the optical path length of the arm optical waveguide 41f is set to be longer than the optical path length of each of the arm optical waveguides 41c and 41d by $\pi/4$ radian in terms of phase of light. As a result, the 90-degree hybrid element 41 has an interference performance by which a phase in output characteristic differs between the 3-dB couplers 41h and 41g by 90 degrees.

The connection optical waveguide 51 includes bending portions 51a and 51b, and a straight portion 51c connecting the bending portions 51a and 51b, and has an S-shape as a whole. The bending portion 51a connects to the 3-dB coupler 21d of the polarization beam splitter 21. The bending portion 51b connects to the 90-degree hybrid element 61. Likewise, the connection optical waveguide 52 includes bending portions 52a and 52b, and a straight portion 52c connecting the bending portions 52a and 52b. The bending portion 52a connects to the 3-dB coupler 22d of the polarization beam splitter 22. The bending portion 52b connects to the 90-degree hybrid element 61. That is, the connection optical waveguide 52 couples the input optical waveguide 12 and the 90-degree hybrid element 61 with the polarization beam splitter 22 interposed therebetween.

The 90-degree hybrid element 61 includes a Y-branch optical waveguide 61a connecting to the connection optical waveguide 51, a Y-branch optical waveguide 61b connecting to the connection optical waveguide 52, arm optical waveguides 61c and 61d connecting to the Y-branch optical waveguide 61a, arm optical waveguides 61e and 61f connecting to the Y-branch optical waveguide 61b, a 3-dB coupler 61g that is a directional coupler and connects to the arm optical waveguides 61c and 61f, a 3-dB coupler 61h that is a directional coupler and connects to the arm optical waveguides 61d and 61e, output optical waveguides 61i and 61j connecting to the 3-dB coupler 61g, and output optical waveguides 61k and 61l connecting to the 3-dB coupler 61h. The 90-degree hybrid element 61 is formed in such an approximately straight line manner that extends from the light input edge face 100a side toward the light output edge face 100b, and the output optical waveguides 61i, 61j, 61k, and 61l reach the light output edge face 100b.

The arm optical waveguides 61c and 61d have an identical optical path length. The optical path length of the arm optical waveguide 61e and the optical path length of the arm optical waveguide 61f are set such that the optical path difference is 90 degrees in terms of phase of light. For example, the optical path length of the arm optical waveguide 61e is set to be shorter than the optical path length of each of the arm optical waveguides 61c and 61d by $\pi/4$ radian in terms of phase of light, while the optical path length of the arm optical waveguide 61f is set to be longer than the optical path length of each of the arm optical waveguides 61c and 61d by $\pi/4$ radian in terms of phase of light. As a result, the 90-degree hybrid element 61 has an interference performance by which a phase in output characteristic differs between the 3-dB couplers 61h and 61g by 90 degrees.

In the optical waveguide circuit 100, the polarization beam splitters 21 and 22, the connection optical waveguides 31 and 32, and the 90-degree hybrid element 41 are arranged so as to form an S-shape. In addition, the polarization beam splitters 21 and 22, the connection optical waveguides 51 and 52, and the 90-degree hybrid element 61 are also arranged so as to form another S-shape. Accordingly, in the optical waveguide circuit 100, the polarization beam splitters 21 and 22 and the 90-degree hybrid elements 41 and 61 are arranged parallel in a width direction between side surfaces 100c and 100d of the optical waveguide circuit 100. This results in the distance (length) between the light input edge face 100a and the light output edge face 100b being not too long relative to the distance (width) between the side surfaces 100c and 100d. Consequently, the optical waveguide circuit 100 has a shape which is compact and easy to handle.

Next, an example of operation of the optical waveguide circuit 100 is described. First, as illustrated in FIG. 1, a signal light L1 serving as a first light is input to the input optical waveguide 11, while an LO light L2 serving as a second light is input to the input optical waveguide 12. The signal light L1 is a DP-QPSK signal light obtained by polarization-multiplexing a QPSK signal light of a certain polarization (X polarization) and a QPSK signal light of a polarization (Y polarization) orthogonal to the X polarization. The LO light L2 is obtained by polarization-multiplexing X polarized light and Y polarized light that have an identical intensity. Herein, it is assumed that the signal light L1 and the LO light L2 have an identical wavelength. However, they may have different wavelengths. The wavelength of the signal light L1 and the LO light L2 is within a communication wavelength bandwidth used for optical communication, for example. For example, the wavelength is any wavelength in a wavelength ranging from 1520 nm to 1630 nm.

Figure 2:
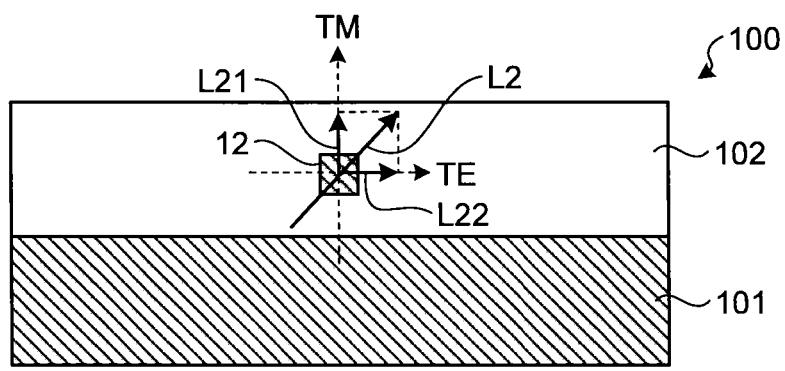
FIG. 2 is a schematic cross-sectional view explaining a polarization state of the LO light.
Figure 3:
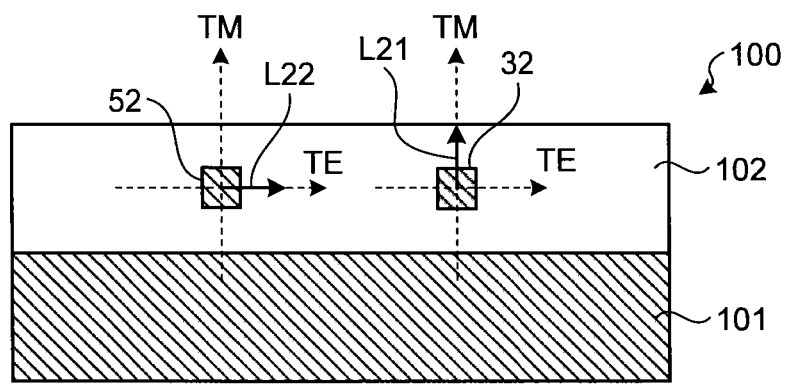
FIG. 3 is a schematic cross-sectional view explaining the polarization state of the LO light.

How the input LO light L2 is polarization-split by the polarization beam splitter 22 is explained using FIGS. 2 and 3. FIGS. 2 and 3 are schematic cross-sectional views explaining a polarization state of the LO light L2. The section of FIG. 2 illustrates the section at an edge portion of the input optical waveguide 12 on the Y-branch optical waveguide 22a side. The section of FIG. 3 illustrates the section of the connection optical waveguides 32 and 52 on the output port side of the 3-dB coupler 22d. As illustrated in FIGS. 2 and 3, the optical waveguide circuit 100 is structured by the optical waveguides, which includes the input optical waveguide 12, formed in a cladding layer 102 that is made of silica glass based material and formed on a substrate 101 made of silicon or the like.

As illustrated in FIG. 2, the LO light L2 is obtained by polarization-multiplexing Y polarized light L21 and X polarized light L22 that have an identical intensity. The LO light L2 is input to the input optical waveguide 12 such that the X polarized light L22 is made TE polarized while the Y polarized light L21 is made TM polarized. That is, the LO light L2 can be regarded as linear polarized light when the Y polarized light L21 and the X polarized light L22 have an identical phase, and the LO light L2 is input such that the polarization surface of LO light L2 makes an angle of 45 degrees with respect to each of the TE polarization and the TM polarization. On the other hand, the LO light L2 has generally elliptic polarization when the Y polarized light L21 and the X-polarized light L22 have different phases. The long axis of the ellipse makes an angle of 45 degrees with respect to each of the TE polarization and TM polarization because the polarization components have an identical intensity. Because the input optical waveguide 12 has an approximately straight line shape, the light L22 is guided as the TE polarized light without change and the light L21 is guided as the TM polarized light without change, and they are input to the Y-branch optical waveguide 22a of the polarization beam splitter 22.

In this way, in the optical waveguide circuit 100, the input optical waveguide 12 having an approximately straight line shape causes the input LO light L2 to input to the polarization beam splitter 22 while the polarization state of the LO light L2 is maintained. As a result, the polarization state of the LO light L2 input to the polarization beam splitter 22 is in a state according to design of the polarization beam splitter 22, and the LO light L2 is input with a stable polarization state. Accordingly, as illustrated in FIG. 3, the light L22 and the light L21, which are the polarization components orthogonal to each other of the input LO light L2, are suppressed or prevented from causing polarization crosstalk on the output port side of the 3-dB coupler 22d. As a result, the light L21 is output to the connection optical waveguide 32 with a stable light intensity as the TM polarized light without change. The light L22 is output to the connection optical waveguide 52 with a stable light intensity as the TE polarized light without change.

On the other hand, the signal light L1 is input to the input optical waveguide 11 while the polarization-multiplexed X polarized QPSK signal light and Y polarized QPSK signal light generally do not coincide with the TE polarization and the TM polarization, respectively. The polarization component, which is the TE polarized light at the input edge of the input optical waveguide 11 is guided as the TE polarized light without change, and the polarization component, which is the TM polarized light at the input edge, is guided as the TM polarized light without change, and they are input to the Y-branch optical waveguide 21a of the polarization beam splitter 21 in stable polarization states as according to design. Thereafter, the polarization-multiplexed QPSK signal light is polarization-split by the polarization beam splitter 21 while the polarization crosstalk is suppressed or prevented. As a result, of the polarization-multiplexed QPSK signal light, the component having the TE polarization at the input edge of the input optical waveguide 11 is output to the connection optical waveguide 51 with a stable light intensity as the TE polarized light without change. On the other hand, of the polarization-multiplexed QPSK signal light, the component having the TM polarization at the input edge is output to the connection optical waveguide 31 with a stable light intensity as the TM polarized light without change. At this time, the signal light components optically polarization-split are not those polarization inverse-multiplexed to the X polarization component and the Y polarization component multiplexed at the transmission side of the QPSK signal light. As described below, the polarization inverse-multiplexing is carried out as follows: the 90-degree hybrid elements 41 and 61 cause the interference between the polarization-split signal light components and the light L21 and the light L22 obtained by polarization-splitting the LO light L2, and resulting light is received, and thereafter digital signal processing is applied to the received light.

After being polarization-split by the polarization beam splitter 21 or 22, the TM polarized light L21 of the LO light L2 is guided by the connection optical waveguide 32 and input to the Y-branch optical waveguide 41b of the 90-degree hybrid element 41. The QPSK signal light split as the TM polarized light is guided by the connection optical waveguide 31 and input to the Y-branch optical waveguide 41a of the 90-degree hybrid element 41. The 90-degree hybrid element 41 causes the interference between the light L21 and the QPSK signal light split as the TM polarized light and outputs signal light of an I-channel component included in the QPSK signal light to the output optical waveguides 41i and 41j with a stable light intensity. Likewise, the 90-degree hybrid element 41 outputs signal light of a Q-channel component included in the QPSK signal light to the output optical waveguides 41k and 41l with a stable light intensity.

The TM polarized signal light of the I channel component and the TM polarized signal light of the Q channel component output from the output optical waveguides 41i and 41j and the output optical waveguides 41k and 41l are respectively received and converted into electrical signals by B-PD, and thereafter subjected to predetermined digital signal processing and demodulated.

On the other hand, the TE polarized light L22 of the LO light L2 is guided by the connection optical waveguide 52 and input to the Y-branch optical waveguide 61b of the 90-degree hybrid element 61. The QPSK signal light split as the TE polarized light is guided by the connection optical waveguide 51 and input to the Y-branch optical waveguide 61a of the 90-degree hybrid element 61. The 90-degree hybrid element 61 causes the interference between the light L22 and the QPSK signal light split as the TE polarized light and outputs signal light of the I-channel component included in the QPSK signal light to the output optical waveguides 61i and 61j with a stable light intensity. Likewise, the 90-degree hybrid element 61 outputs signal light of the Q-channel component included in the QPSK signal light to the output optical waveguides 61k and 61l with a stable light intensity.

Likewise, the TE polarized signal light of the I channel component and TE polarized signal light of the Q channel component output from the output optical waveguides 61i and 61j and the output optical waveguides 61k and 61l are respectively received and converted into electrical signals by the B-PD, and thereafter subjected to predetermined digital signal processing and demodulated.

As described above, the optical waveguide circuit 100 according to the first embodiment has an effect that the polarization state and the light output intensity of the TM polarized and the TE polarized are stable because the approximately straight line shape of the input optical waveguides 11 and 21 enables the polarization beam splitters 21 and 22 to polarization-split the TM polarized light and the TE polarized light without occurrence of the polarization crosstalk.

Next, an effect that polarization dependence is stable in the optical waveguide circuit 100 according to the first embodiment is more specifically described with reference to the structure of the optical waveguide circuit described in the earlier application of the inventors (International Application Number PCT/JP2010/065313) that can be used as the PBS-integrated coherent mixer in the same manner as the optical waveguide circuit 100 as an example.

Figure 8:
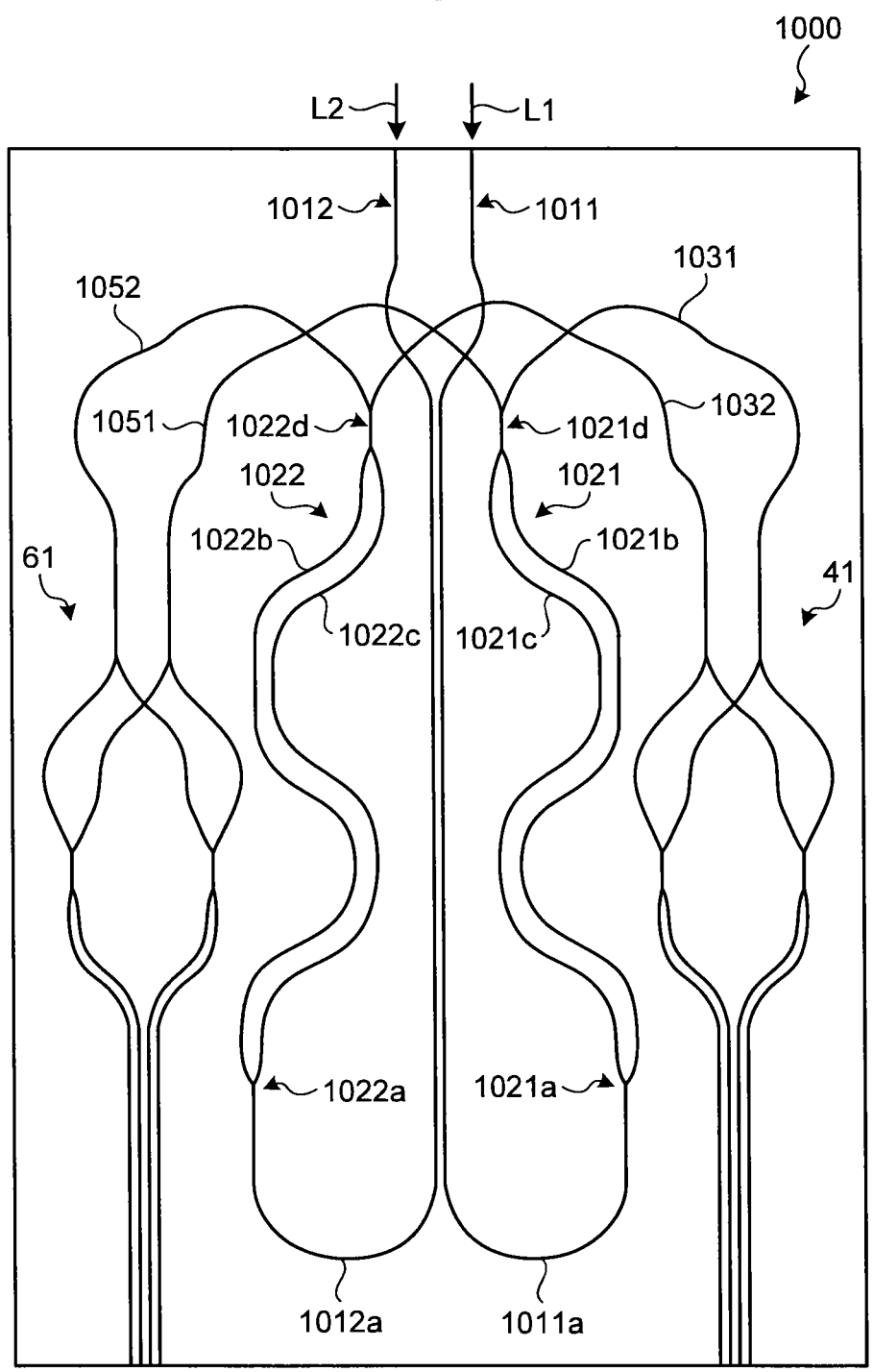
FIG. 8 is a schematic plan view illustrating an example of an optical waveguide circuit that can be used as a PBS-integrated coherent mixer.

FIG. 8 is a schematic plan view illustrating an example of the optical waveguide circuit that can be also used as the PBS-integrated coherent mixer. An optical waveguide circuit 1000 illustrated in FIG. 8 is obtained by replacing, in the optical waveguide circuit 100, the polarization beam splitters 21 and 22 with polarization beam splitters 1021 and 1022, respectively, and the connection optical waveguides 31, 32, 51 and 52 with connection optical waveguides 1031, 1032, 1051 and 1052, respectively. The polarization beam splitter 1021 includes a Y-branch optical waveguide 1021a, arm optical waveguides 1021b and 1021c connecting to the Y-branch optical waveguide 1021a, and a 3-dB coupler 1021d that is a directional coupler and connects to the arm optical waveguides 1021b and 1021c. The polarization beam splitter 1022 includes a Y-branch optical waveguide 1022a, arm optical waveguides 1022b and 1022c connecting to the Y-branch optical waveguide 1022a, and a 3-dB coupler 1022d that is a directional coupler and connects to the arm optical waveguides 1022b and 1022c.

Input optical waveguides 1011 and 1012 have bending portions 1011a and 1012a having a U-shape, respectively, unlike the input optical waveguides 11 and 12.

Figure 9:
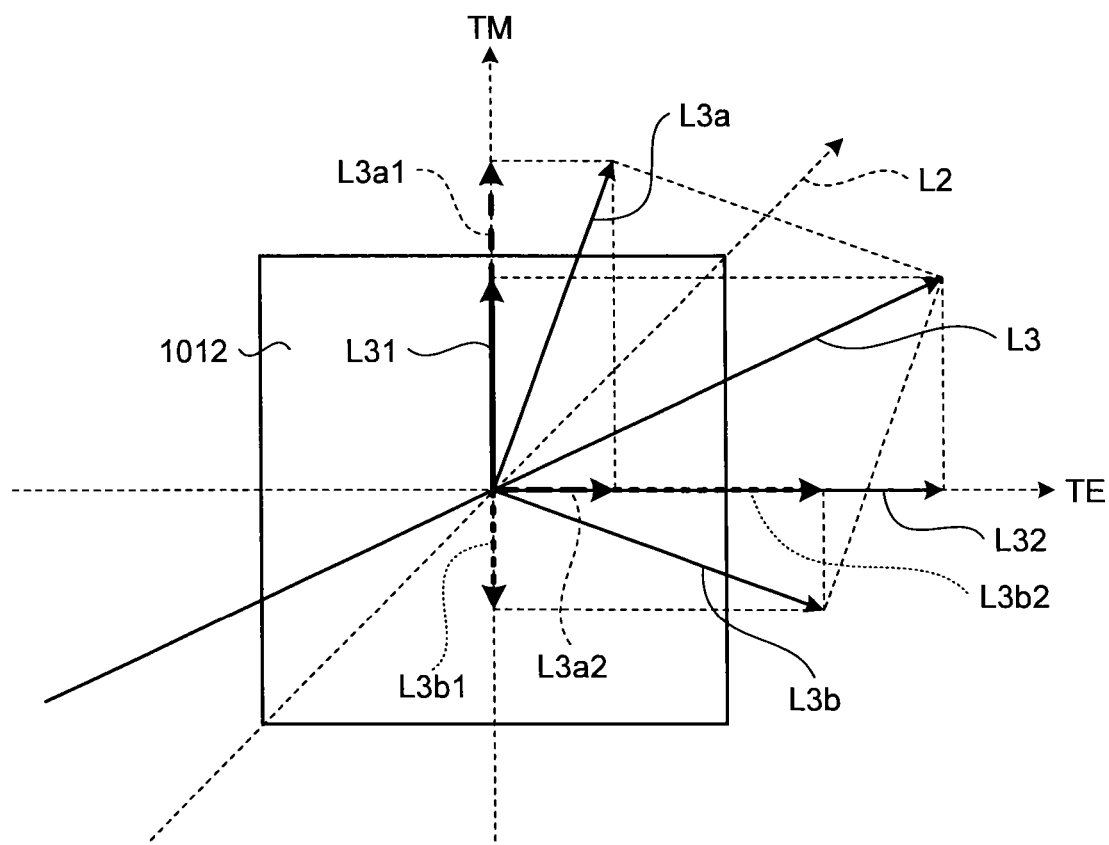
FIG. 9 is a schematic cross-sectional view explaining the polarization state of the LO light.
Figure 10:
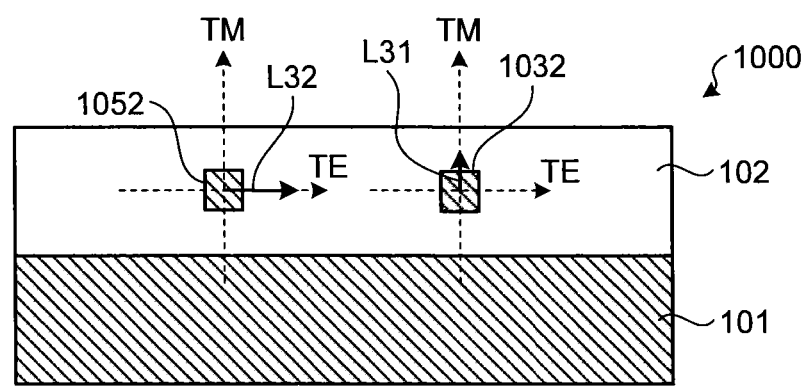
FIG. 10 is a schematic cross-sectional view explaining the polarization state of the LO light.

How the input LO light L2 is polarization-split by the polarization beam splitter 1022 is explained using FIGS. 9 and 10. FIGS. 9 and 10 are schematic cross-sectional views explaining a polarization state of the LO light L2. The section of FIG. 9 illustrates the enlarged section at an edge portion of the input optical waveguide 1012 on the Y-branch optical waveguide 1022a side. The section of FIG. 10 illustrates the section of the connection optical waveguides 1032 and 1052 on the output port side of the 3-dB coupler 1022d. The optical waveguide circuit 1000 is also structured by the optical waveguides, which include the input optical waveguide 1012, formed in the cladding layer 102 that is made of silica based glass material and formed on the substrate 101 made of silicon or the like.

In the optical waveguide circuit 1000, the input optical waveguide 1012 has the bending portion 1012a having a U-shape. Accordingly, even when the LO light L2 is input to the input optical waveguide 1012 such that the polarization surface of the LO light L2 makes an angle of 45 degrees with respect to the TE polarization and the TM polarization in the same manner as the optical waveguide circuit 100, the polarization surface rotates, resulting in the polarization state being changed to a polarization state illustrated as an LO light L3, for example.

As a result of intensive examinations of the inventors, it was found that the polarization surface of light guided in an optical waveguide rotates due to stress and the like when the waveguide has the bending portion.

If the polarization surface of light rotates in the input optical waveguide 1012, the LO light L3 enters the polarization beam splitter 1022 with a different polarization state from the designed polarization state. As a result, the results of output of the polarization beam splitter 1022 differ from the designed results. FIG. 9 illustrates how the LO light L3 is decomposed into the axes of the TM polarization and the TE polarization. A Light L3a and a light L3b are the results of rotation of the light L21 and light L22, which are obtained by decomposing the LO light L2 into the TM and TE polarized components (refer to FIG. 2). The respective components projected on the TM polarization axis and the TE polarization axis of the light L3a are a light L3a1 and a light L3a2 while the respective components projected on the TM polarization axis and the TE polarization axis of the light L3b are a light L3b1 and a light L3b2. The TM polarized component of light output from the polarization beam splitter 1022 after being polarization-split by the polarization beam splitter 1022 is obtained by combining the light L3a1 and light L3b1, while the TE polarized component of the light is obtained by combining the light L3a2 and light L3b2.

If the light L3 is the linear polarized light, the light L3a and the light L3b have an identical phase. As a result, light L31 obtained by combining the light L3a1 and the light L3b1, and light L32 obtained by combining the light L3a2 and the light L3b2 can be obtained as the output of the polarization beam splitter 1022 (refer to FIG. 10). The light L31 and the light L32 are the components obtained by projecting the light L3 on the TM and TE polarization axes. At this time, an intensity ratio between the light L31 of the TM polarized component and the light L32 of the TE polarized component changes away from 1:1 depending on the rotation angle of the LO light L3. This change causes a problem when the polarization-multiplexed QPSK signal is demodulated.

When a group delay between the X polarized component and the Y polarized component of the input LO light L2 fluctuates, the light L3a and the light L3b have a random phase difference therebetween. In this case, the intensity of output light obtained by combining the light L3a1 and the light L3b1 on the TM polarization axis depends on the phase difference. The intensity of output light obtained by combining the light L3a2 and the light L3b2 on the TE polarization axis also depends on the phase difference. Accordingly, an interference state of the output of the polarization beam splitter 1022 fluctuates, thereby causing the light intensity to be unstable. Similar instability of the output light also occurs in the polarization beam splitter 1021. As a result, the intensities of light outputs from the 90-degree hybrid elements 41 and 61, in which output light from the polarization beam splitters 1021 and 1022 are input and subjected to predetermined optical signal processing, become also unstable.

In contrast, in the optical waveguide circuit 100 according to the first embodiment, the rotation of the polarization surface of the input LO light L2 hardly occurs because the input optical waveguides 11 and 12 have an approximately straight line shape. As a result, the output light intensities of the polarization beam splitters 21 and 22, and furthermore the output light intensities of the output optical waveguides 41i, 41j, 41k, 41l, 61i, 61j, 61k, and 61l are stable.

Figure 4:
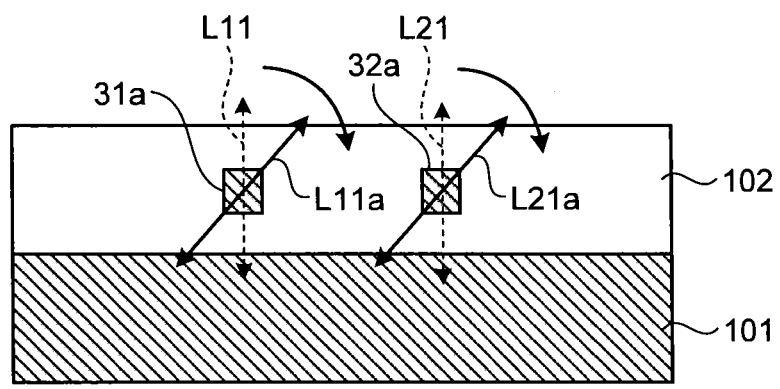
FIG. 4 is a schematic diagram explaining a polarization state of light in bending portions of connection optical waveguides.
Figure 5:
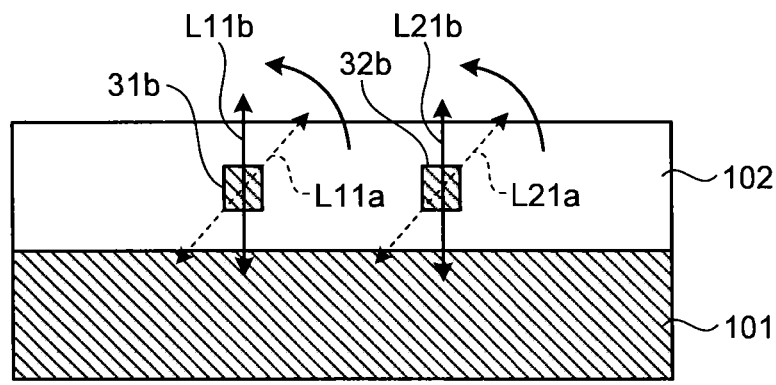
FIG. 5 is a schematic diagram explaining the polarization state of light in bending portions of the connection optical waveguides.

Next, the polarization state of light in the connection waveguide is described. FIG. 4 is a schematic diagram explaining the polarization state of light in the bending portions 31a and 32a of the connection optical waveguides 31 and 32. FIG. 5 is a schematic diagram explaining the polarization state of light in the bending portions 31b and 32b of the connection optical waveguides 31 and 32.

As illustrated in FIG. 4, in the bending portion 31a, the polarization surface of the TM polarized light L21 polarization-split from the LO light L2 by the polarization beam splitter 22 rotates clockwise in FIG. 4 as a light L21a, for example. Likewise, in the bending portion 32a, the polarization surface of the TM polarized light L11 polarization-split from the signal light L1 by the polarization beam splitter 21 rotates as a light L11a in the same direction as the light L21.

The curvatures of the bending portions 31b and 32b are set to be opposite in positive and negative to those of the bending portions 31a and 32a. As a result, in the bending portion 31b, the polarization surface of the light L11a rotates in a counterclockwise direction in FIG. 5 and the polarization state changes to the polarization state as the light L11b. Also, in the bending portion 32b, the polarization surface of the light L21a rotates in a counterclockwise direction in FIG. 5 and the polarization state changes to the polarization state as the light L21b. In this way, the bending portions 31a and 31b, and the bending portions 32b and 32b have the curvature opposite in positive and negative to each other, whereby the rotations of the polarization surfaces in the respective bending portions cancel each other.

Likewise, in the connection optical waveguides 51 and 52, the bending portions 51a and 51b, and the bending portions 52a and 52b have the curvatures opposite in positive and negative to each other, whereby the rotations of the polarization surfaces in the respective bending portions cancel each other.

It is more preferable for the respective bending portions of the connection optical waveguides 31, 32, 51, and 52 that the curvature radii and angles of arcs of the respective bending portions are set such that the rotation of the polarization surface of light taking place in one bending portion is thoroughly cancelled in the other bending portion in the same connection optical waveguide. For the rotations of the polarization surfaces of light taking place in the respective bending portions to thoroughly cancel each other, a design is preferable in which the two bending portions are combined in such a way that the curvatures are opposite in positive and negative to each other, and in which the curvature radii are identical, and the angles of the arc are identical.

The rotations of the polarization surfaces of light, however, do not need to thoroughly cancel each other. If the curvature radii and the angles of the arcs do not cause the relative relationship of the polarization states of the light L11 and the light L21 guided by the connection optical waveguides 31 and 32, respectively, to be changed before and after being guided, a desired stable interference performance can be achieved by the 90-degree hybrid element 41. The above description is applied to the connection optical waveguides 51 and 52 in the same way.

The bending portions 21ba, 21ca, 22ba, and 22ca of the respective arm optical waveguides 21b, 21c, 22b, and 22c of the polarization beam splitters 21 and 22 have an S-shape, combining two bending portions having curvatures opposite in positive and negative to each other, identical curvature radii, and identical angles of the arc. Consequently, the rotations of the polarization surfaces of light in the respective bending portions approximately thoroughly cancel each other.

In the optical waveguide circuit 100 according to the first embodiment, an intersection of the optical waveguides is one point, which is the intersection of the connection optical waveguides 32 and 52 and positioned on the light output edge face 100b side of the optical waveguide circuit 100. When there are numerous intersections at which the optical waveguides intersect each other, a loss in light intensity may increase, and when furthermore a crosstalk component occurs at the intersection, signal quality may deteriorate. Thus, the presence of numerous intersections is not preferable. In the optical waveguide circuit 100, it is preferable that the intersection is only one point, and thus the loss in light intensity and the deterioration of signal quality are drastically suppressed.

Figure 6:
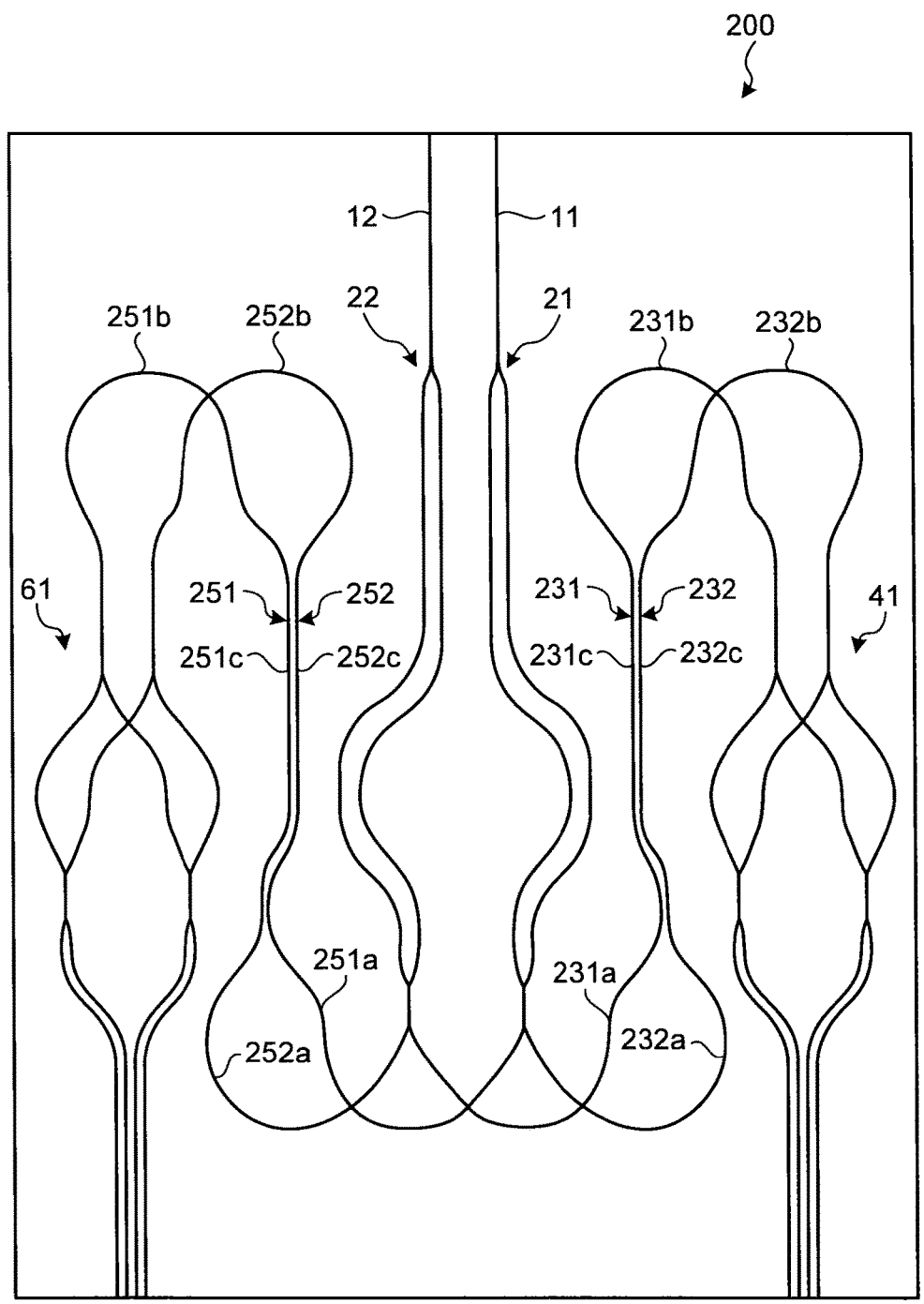
FIG. 6 is a schematic plan view illustrating an optical waveguide circuit according to a second embodiment.

Next, a second embodiment of the present invention is described. FIG. 6 is a schematic plan view of an optical waveguide circuit according to the second embodiment. An optical waveguide circuit 200 has a structure obtained by replacing, in the optical waveguide circuit 100 illustrated in FIG. 1, the connection optical waveguides 31, 32, 51, and 52 with connection optical waveguides 231, 232, 251, and 252, respectively.

The connection optical waveguide 231 includes bending portions 231a and 231b, and a straight portion 231c connecting the bending portions 231a and 231b, and has an S-shape as a whole. The bending portion 231a connects to the polarization beam splitter 21. The bending portion 231b connects to the 90-degree hybrid element 41. Likewise, the connection optical waveguide 232 includes bending portions 232a and 232b, and a straight portion 232c connecting the bending portions 232a and 232b. The bending portion 232a connects to the polarization beam splitter 22. The bending portion 232b connects to the 90-degree hybrid element 41.

Likewise, the connection optical waveguide 251 includes bending portions 251a and 251b, and a straight portion 251c connecting the bending portions 251a and 251b, and has an S-shape as a whole. The bending portion 251a connects to the polarization beam splitter 22. The bending portion 251b connects to the 90-degree hybrid element 61. Likewise, the connection optical waveguide 252 includes bending portions 252a and 252b, and a straight portion 252c connecting the bending portions 252a and 252b. The bending portion 252a connects to the polarization beam splitter 22. The bending portion 252b connects to the 90-degree hybrid element 61.

The optical waveguide circuit 200 also has a shape which is compact and easy to handle in such a manner that the length is not too long relative to the width in the same manner as the optical waveguide circuit 100 according to the first embodiment, and the polarization state and the light output intensity are stable.

Furthermore, in the optical waveguide circuit 200, the bending portions 231a, 232a, 251a, and 252a have an identical shape. The bending portions 231b, 232b, 251b, and 252b also have an identical shape. In addition, the straight portions 231c, 232c, 251c, and 252c have an identical shape. That is, in the optical waveguide circuit 200, the respective connection optical waveguides 231, 232, 251, and 252 are structured by combining the bending portions having the identical shape and the straight portions having the identical shape. As a result, the optical path lengths of the respective connection optical waveguides 231, 232, 251, and 252 are readily set to be identical.

The respective TM polarized light and TE polarized light after the polarization beam splitter 21 polarization-splits the input signal light L1 and polarization beam splitter 22 polarization-splits the input LO light L2 need to be input to the respective 90-degree hybrid elements 41 and 61 at the same timing. In the optical waveguide circuit 200, the optical path lengths of the respective connection optical waveguides 231, 232, 251, and 252 are readily set to be identical, thereby readily setting the input timing of light to be equal.

Figure 7:
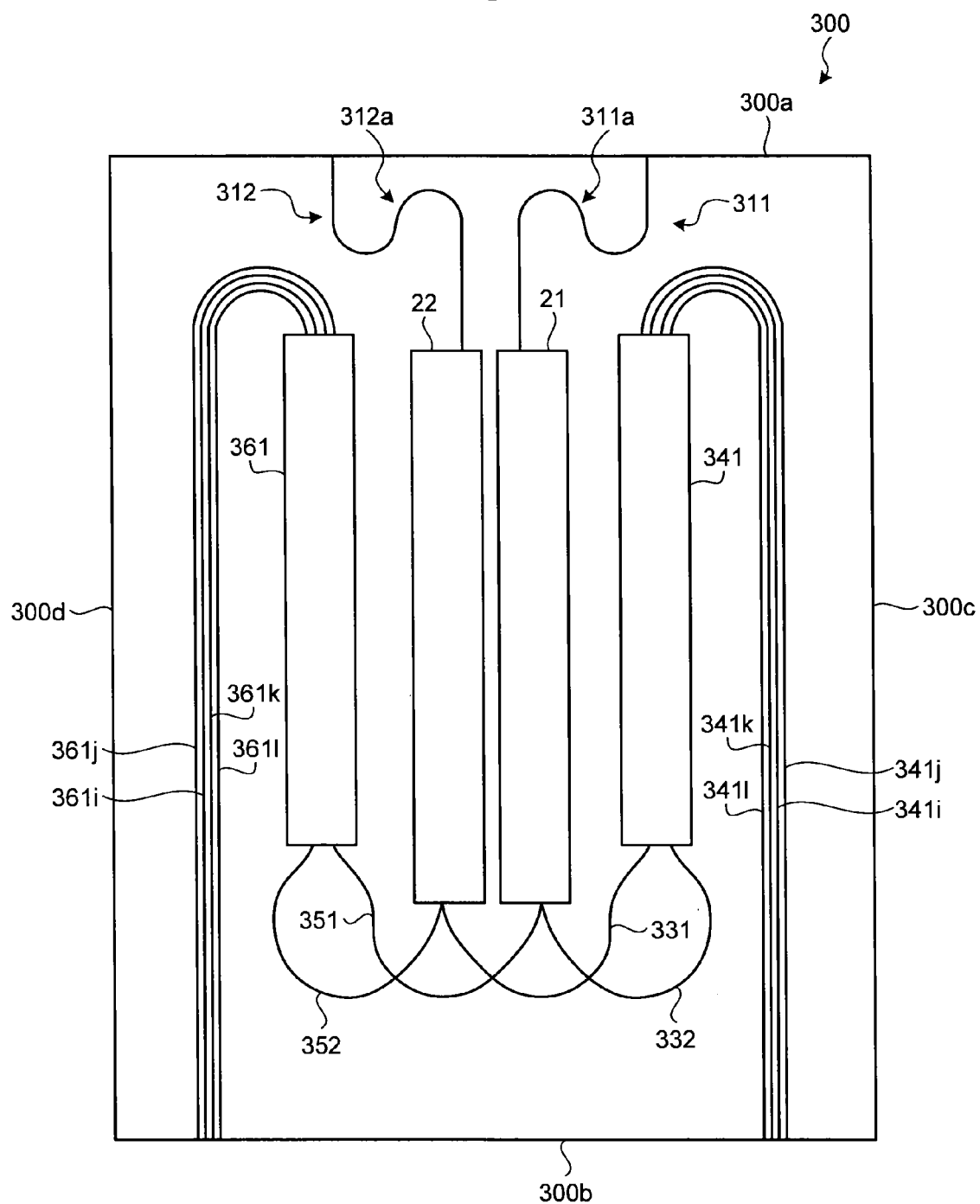
FIG. 7 is a schematic plan view illustrating an optical waveguide circuit according to a third embodiment.

Next, a third embodiment of the present invention is described. FIG. 7 is a schematic plan view of an optical waveguide circuit according to the third embodiment. An optical waveguide circuit 300 has a structure by replacing, in the optical waveguide circuit 100 illustrated in FIG. 1, the input optical waveguides 11 and 12 with input optical waveguides 311 and 312, the connection optical waveguides 31, 32, 51, and 52 with connection optical waveguides 331, 332, 351, and 352, respectively, and the 90-degree hybrid elements 41 and 61 with 90-degree hybrid elements 341 and 361, respectively.

The input optical waveguide 311 has a bending portion 311a having an S-shape, combining first and second bending portions having curvatures opposite in positive and negative to each other, identical curvature radii, and identical angles of the arc. The input optical waveguide 312 also has a bending portion 312a having an S-shape, combining first and second bending portions having curvatures opposite in positive and negative to each other, identical curvature radii, and identical angles of the arc. Accordingly, the rotations of the polarization surfaces of light taking place in the respective bending portions approximately thoroughly cancel each other in the input optical waveguides 311 and 312. As a result, in the same manner as the input optical waveguides 11 and 12 of the optical waveguide circuit 100 according to the first embodiment, the signal light L1 and the LO light L2 to be input to the polarization beam splitters 21 and 22 have stable polarization states as according to design. Consequently, the optical waveguide circuit 300 has a stable light output intensity.

The 90-degree hybrid element 341 includes the same Y-branch optical waveguides, arm optical waveguides, and 3-dB couplers as the 90-degree hybrid element 41. Output optical waveguides 341i, 341j, 341k, and 341l are arranged so as to extend from the 3-dB couplers to a light input edge face 300a side, and thereafter turn in a U-shape and extend to a light output edge face 300b side.

Likewise, the 90-degree hybrid element 361 includes the same Y-branch optical waveguides, arm optical waveguides, and 3-dB couplers as the 90-degree hybrid element 61. Output optical waveguides 361i, 361j, 361k, and 361l are arranged so as to extend from the 3-dB couplers to the light input edge face 300a side, and thereafter turn in a U-shape and extend to the light output edge face 300b side.

Accordingly, in the optical waveguide circuit 300, the polarization beam splitters 21 and 22, the connection optical waveguides 331 and 332, and the 90-degree hybrid element 341 are arranged so as to form an S-shape as a whole. In addition, the polarization beam splitters 21 and 22, the connection optical waveguides 351 and 352, and the 90-degree hybrid element 361 are also arranged so as to form another S-shape as a whole. Accordingly, in the optical waveguide circuit 300, the polarization beam splitters 21 and 22 and the 90-degree hybrid elements 341 and 361 are arranged parallel between side surfaces 300c and 300d of the optical waveguide circuit 300. This results in the length between the light input edge face 300a and the light output edge face 300b being not too long relative to the width between the side surfaces 300c and 300d. Consequently, the optical waveguide circuit 300 has a shape which is compact and easy to handle.

Figure 11:
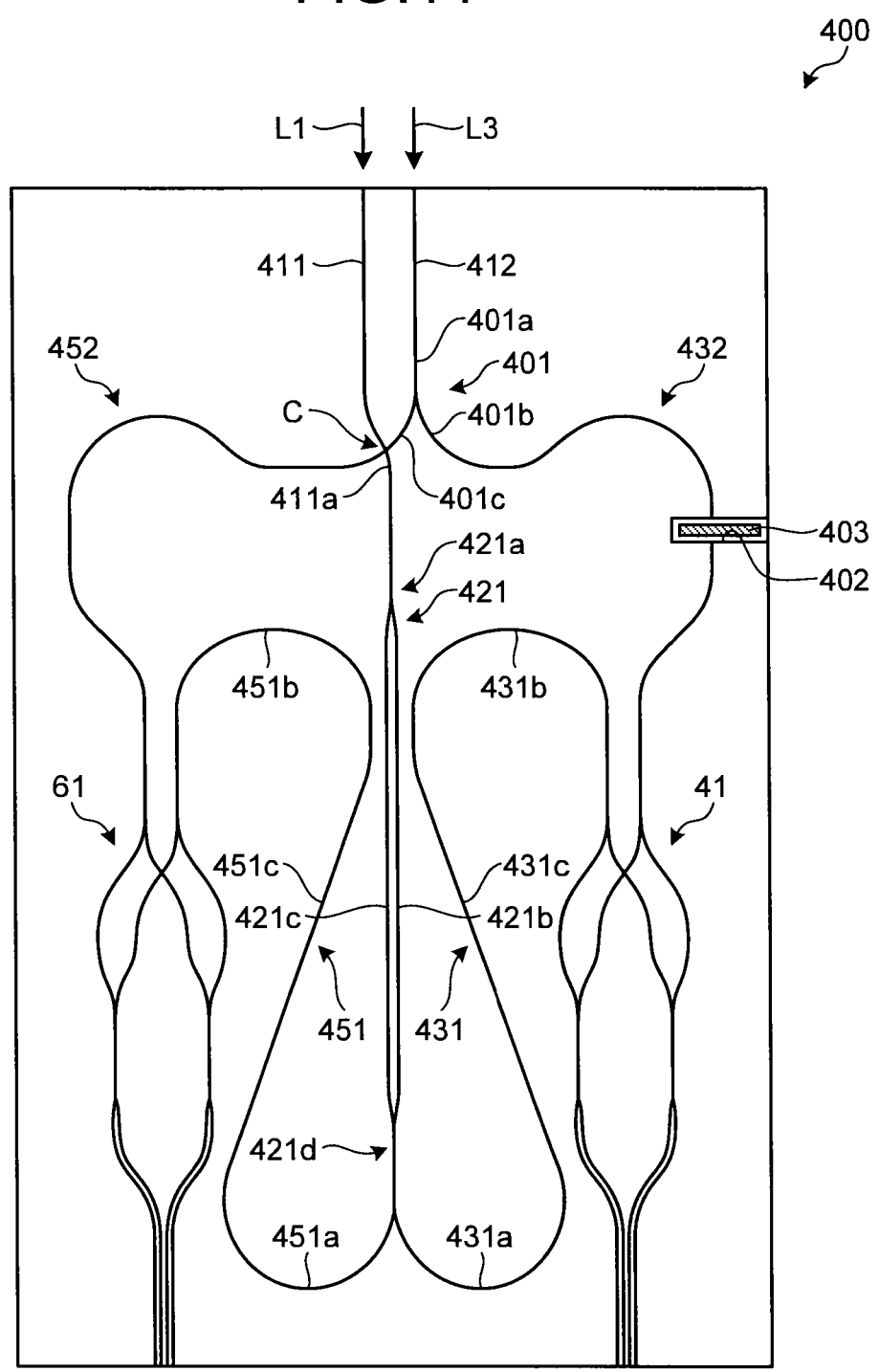
FIG. 11 is a schematic plan view illustrating an optical waveguide circuit according to a fourth embodiment.

Next, a fourth embodiment of the present invention is described. FIG. 11 is a schematic plan view of an optical waveguide circuit according to the fourth embodiment. An optical waveguide circuit 400 has a structure obtained by replacing, in the optical waveguide circuit 100 illustrated in FIG. 1, the input optical waveguides 11 and 12 with input optical waveguides 411 and 412, and the polarization beam splitter 21 with a polarization beam splitter 421, by eliminating the polarization beam splitter 22, and by replacing the connection optical waveguides 31, 32, 51, and 52 with connection optical waveguides 431, 432, 451, and 452, and by additionally including a Y-branch optical waveguide 401, a slit 402, and a half-wave plate 403.

The input optical waveguide 411, to which the signal light L1 is input, has a bending portion 411a having an S-shape, combining first and second bending portions having curvatures opposite in positive and negative to each other, identical curvature radii, and identical angles of the arc. The input optical waveguide 412 has an approximately straight line shape.

The polarization beam splitter 421 includes a Y-branch optical waveguide 421a connecting to the input optical waveguide 411, arm optical waveguides 421b and 421c connecting to the Y-branch optical waveguide 421a and having a straight line shape, and a 3-dB coupler 421d that is a directional coupler and connects to the arm optical waveguides 421b and 421c.

The connection optical waveguide 431 includes bending portions 431a and 431b, and a straight portion 431c connecting the bending portions 431a and 431b, and has an S-shape as a whole. The bending portion 431a connects to the 3-dB coupler 421d of the polarization beam splitter 421. The bending portion 431b connects to the 90-degree hybrid element 41. Likewise, the connection optical waveguide 451 includes bending portions 451a and 451b, and a straight portion 451c connecting the bending portions 451a and 451b. The bending portion 451a connects to the 3-dB coupler 421d of the polarization beam splitter 421. The bending portion 451b connects to the 90-degree hybrid element 61.

The Y-branch optical waveguide 401 includes an input portion 401a, and output portions 401b and 401c. The input portion 401a connects to the input optical waveguide 412.

The connection optical waveguides 432 and 452 connect to the output portions 401b and 401c of the Y-branch optical waveguide 401, respectively. Each of the connection optical waveguides 432 and 452 have a shape in which two S-shapes, each of which is a combination of first and second bending portions having curvatures opposite in positive and negative to each other, identical curvature radii, and identical angles of the arc, and are continuously connected with a straight portion interposed therebetween. The connection optical waveguides 432 and 452 connect to the 90-degree hybrid elements 41 and 61, respectively. The connection optical waveguide 452 and the input optical waveguide 411 intersect at an intersection C.

The slit 402 is formed by a dicer, etching, or the like at such a depth that the connection optical waveguide 432 is separated. The half-wave plate 403 serving as a polarization rotation element is inserted in the slit 402. As a result, the half-wave plate 403 is inserted in the connection optical waveguide 432. The optical axis of the half-wave plate 403 is adjusted so as to make an angle of 45 degrees with respect to the polarization axis of the connection optical waveguide 432.

In the optical waveguide circuit 400, an LO light L3 serving as the second light is input from the input optical waveguide 412 as the TM polarized light or the TE polarized light. An example when the LO light L3 is input as the TM polarized light is described below, while the same applies to the case where the LO light L3 is input as the TE polarized light.

The Y-branch optical waveguide 401 branches the LO light L3 input from the input portion 401a, and outputs the branched light from the respective output portions 401b and 401c. The connection optical waveguide 432 guides the LO light output from the output portion 401b and inputs the LO light to the 90-degree hybrid element 41. The half-wave plate 403 inserted in the connection optical waveguide 432 rotates the polarization of the TM polarized LO light by 90 degrees and changes the light to the TE polarized LO light. As a result, the LO light is input to the 90-degree hybrid element 41 as the TE polarized light.

On the other hand, the connection optical waveguide 452 guides the LO light output from the output portion 401c and inputs the LO light to the 90-degree hybrid element 61 as the TM polarized light without change. In this way, the TM polarized light and the TE polarized light are generated from the input LO light L3 and input to the respective 90-degree hybrid elements 41 and 61.

Because the half-wave plate 403 is inserted in the connection optical waveguide 432, an excess loss due to an insertion loss of the half-wave plate 403 occurs. Meanwhile, an excess loss due to an intersection loss occurs because the intersection C is present in the connection optical waveguide 452. As a result, the TE polarized LO light input to the 90-degree hybrid element 41 receives the excess loss larger than that of the TM polarized LO light input to the 90-degree hybrid element 61 by an excess loss difference=(the insertion loss of the half-wave plate 403)−(the intersection loss at the intersection C).

In this regard, in the optical waveguide circuit 400 according to the fourth embodiment, a branching ratio of the Y-branch optical waveguide 401 serving as a loss compensation mechanism is set to a branching ratio that compensates the excess loss difference. This setting enables the intensity of the TE polarized LO light input to the 90-degree hybrid element 41 and the intensity of the TM polarized LO light input to the 90-degree hybrid element 61 to be equalized.

For example, when the insertion loss of the half-wave plate 403 is 0.5 dB and the intersection loss at the intersection C is 0.05 dB, the excess loss difference is 0.45 dB. In this case, the excess loss difference is compensated by setting the branching ratio between the output portions 401b and 401c to 0.526:0.474.

Also, in the optical waveguide circuit 400 according to the fourth embodiment, the signal light L1 and the LO light L3, which are input to the polarization beam splitter 421, the 90-degree hybrid element 41, or the 90-degree hybrid element 61, have a stable polarization state as according to design. Consequently, the optical waveguide circuit 400 has a stable light output intensity.

In addition, the polarization beam splitter 421, the connection optical waveguide 431, and the 90-degree hybrid element 41 are arranged so as to form an S-shape as a whole. In addition, the polarization beam splitter 421, the connection optical waveguide 451, and the 90-degree hybrid element 61 are also arranged so as to form another S-shape as a whole. As a result, the optical waveguide circuit 400 also has a shape which is compact and easy to handle.

Figure 12:
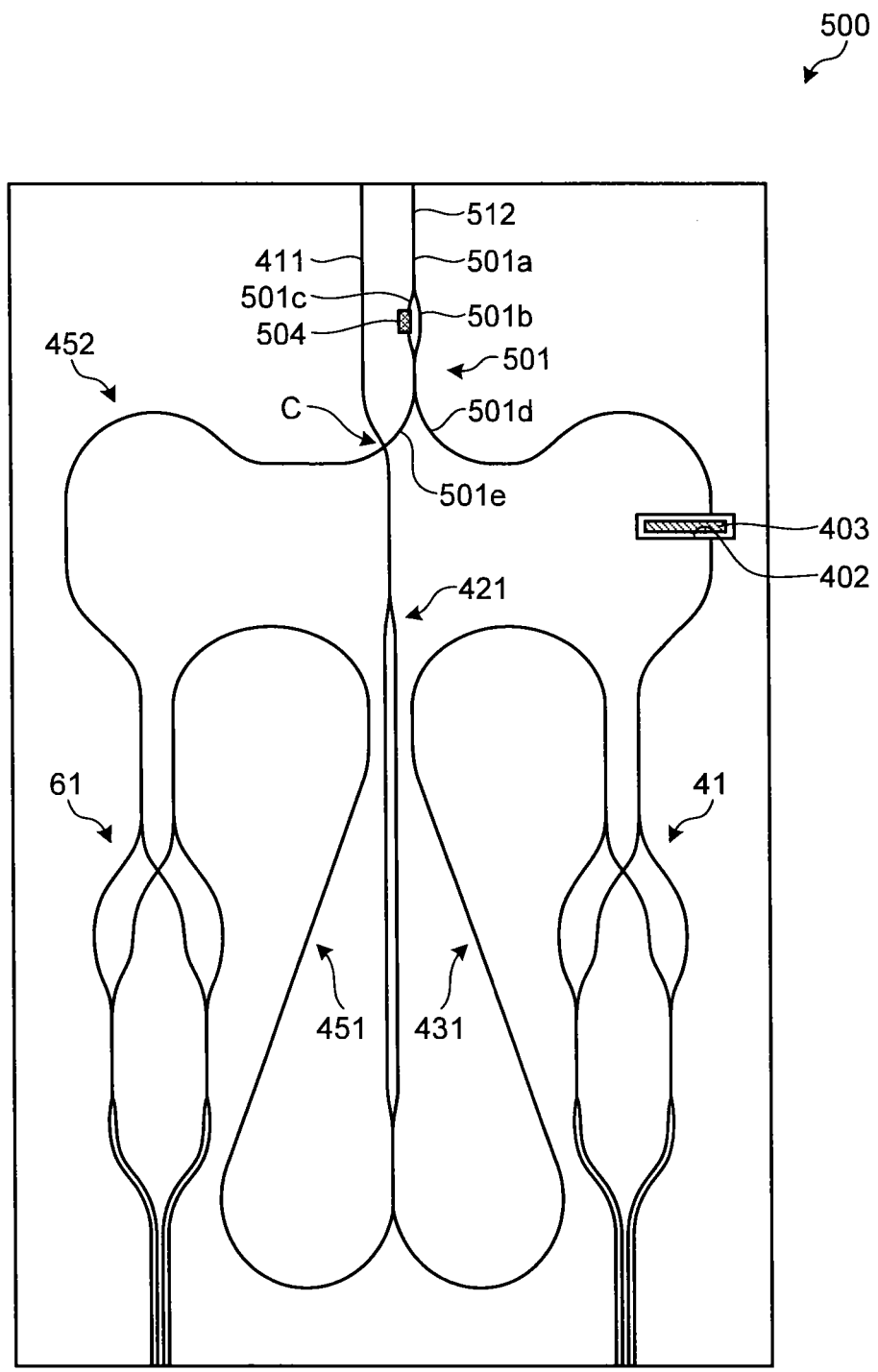
FIG. 12 is a schematic plan view illustrating an optical waveguide circuit according to a fifth embodiment.

Next, a fifth embodiment of the present invention is described. FIG. 12 is a schematic plan view of an optical waveguide circuit according to the fifth embodiment. An optical waveguide circuit 500 has a structure obtained by replacing, in the optical waveguide circuit 400 illustrated in FIG. 11, the input optical waveguide 412 with an input optical waveguide 512, and the Y-branch optical waveguide 401 with an MZI optical branch waveguide 501, and by additionally including a heater 504.

The input optical branching waveguide 512 has an approximately straight line shape. The MZI optical branch waveguide 501 includes an input portion 501a, arm waveguides 501b and 501c, and output portions 501d and 501e. The input portion 501a connects to the input optical waveguide 512. The heater 504 is a heater formed on a surface of a cladding layer above the arm waveguide 501c, and is made of a metal thin film, for example.

Also in the optical waveguide circuit 500, the branching ratio of the MZI optical branch waveguide 501 serving as the loss compensation mechanism is set to be a branching ratio that compensates the excess loss difference (the insertion loss of the half-wave plate 403)−(the intersection loss at the intersection C). This setting enables the intensity of the TE polarized LO light input to the 90-degree hybrid element 41 and the intensity of the TM polarized LO light input to the 90-degree hybrid element 61 to be equalized.

In addition, the optical waveguide circuit 500 includes the heater 504. Accordingly, the branching ratio of the MZI optical branch waveguide 501 can be adjusted by locally heating the arm waveguide 501c to permanently change an effective refractive index thereof while heating time of the heater 504 is regulated. For example, the excess loss difference is measured after the optical waveguide circuit 500 is manufactured, and the branching ratio of the MZI optical branch waveguide 501 can be adjusted by the heater 504 so as to compensate the measured excess loss difference. As a result, the intensity of the TE polarized LO light and the intensity of the TM polarized LO light can be more accurately equalized.

Figure 13A:
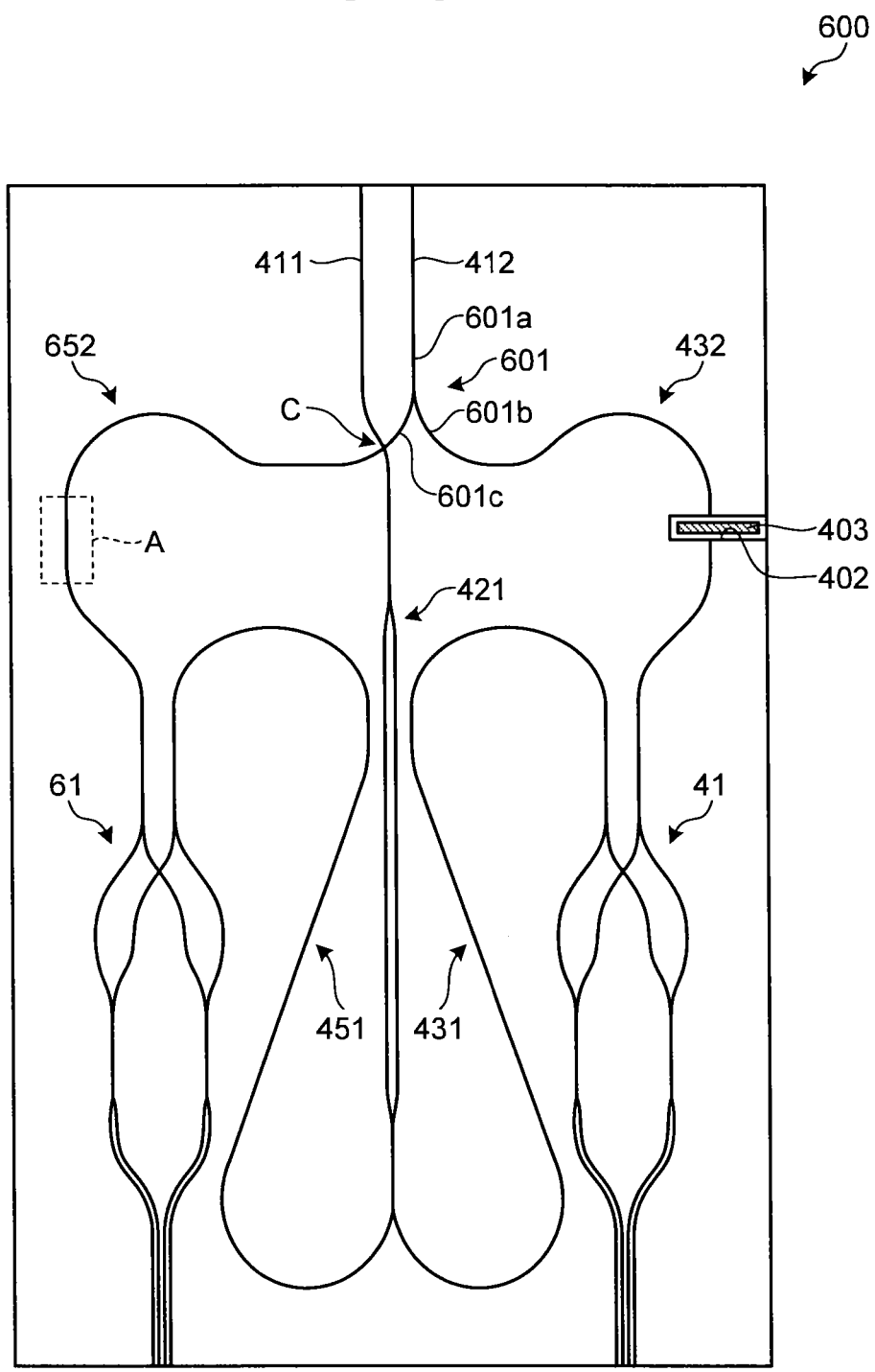
FIG. 13A is a schematic plan view of an optical waveguide circuit according to a sixth embodiment.
Figure 13B:
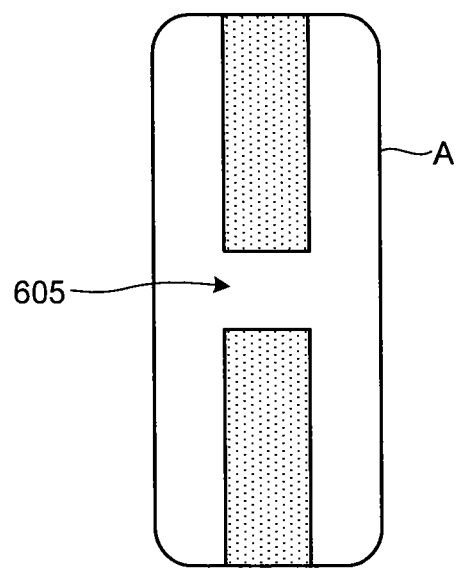
FIG. 13B is a partially enlarged view of the optical waveguide circuit illustrated in FIG. 13A.

Next, a sixth embodiment of the present invention is described. FIG. 13A is a schematic plan view of an optical waveguide circuit according to the sixth embodiment. FIG. 13B is a partially enlarged view of the optical waveguide circuit illustrated in FIG. 13A. An optical waveguide circuit 600 has a structure obtained by replacing, in the optical waveguide circuit 400 illustrated in FIG. 11, the Y-branch optical waveguide 401 with a Y-branch optical waveguide 601 and the connection optical waveguide 452 with a connection optical waveguide 652.

The Y-branch optical waveguide 601 includes an input portion 601a, and output portions 601b and 601c. The input portion 601a connects to the input optical waveguide 412. The branching ratio of the output portions 601b and 601c of the Y-branch optical waveguide 601 is 1:1.

The connection optical waveguide 652 has a shape in which two S-shapes are continuously connected in the same manner as the connection optical waveguide 452, and has a gap optical waveguide portion 605 serving as an optical loss portion, which is the loss compensation mechanism, at an area A as illustrated in FIG. 13B. The gap optical waveguide portion 605 is a gap halfway in the optical waveguide and the gap is filled with silica glass based material the same as that of the cladding layer.

In the optical waveguide circuit 600, a radiation loss of the gap optical waveguide portion 605 is set to a value that compensates the excess loss difference (the insertion loss of the half-wave plate 403)−(the intersection loss at the intersection C). This setting enables the intensity of the TE polarized LO light input to the 90-degree hybrid element 41 and the intensity of the TM polarized LO light input to the 90-degree hybrid element 61 to be equalized. The radiation loss of the gap optical waveguide portion 605 can be increased or decreased by widening or narrowing the gap.

Figure 14:
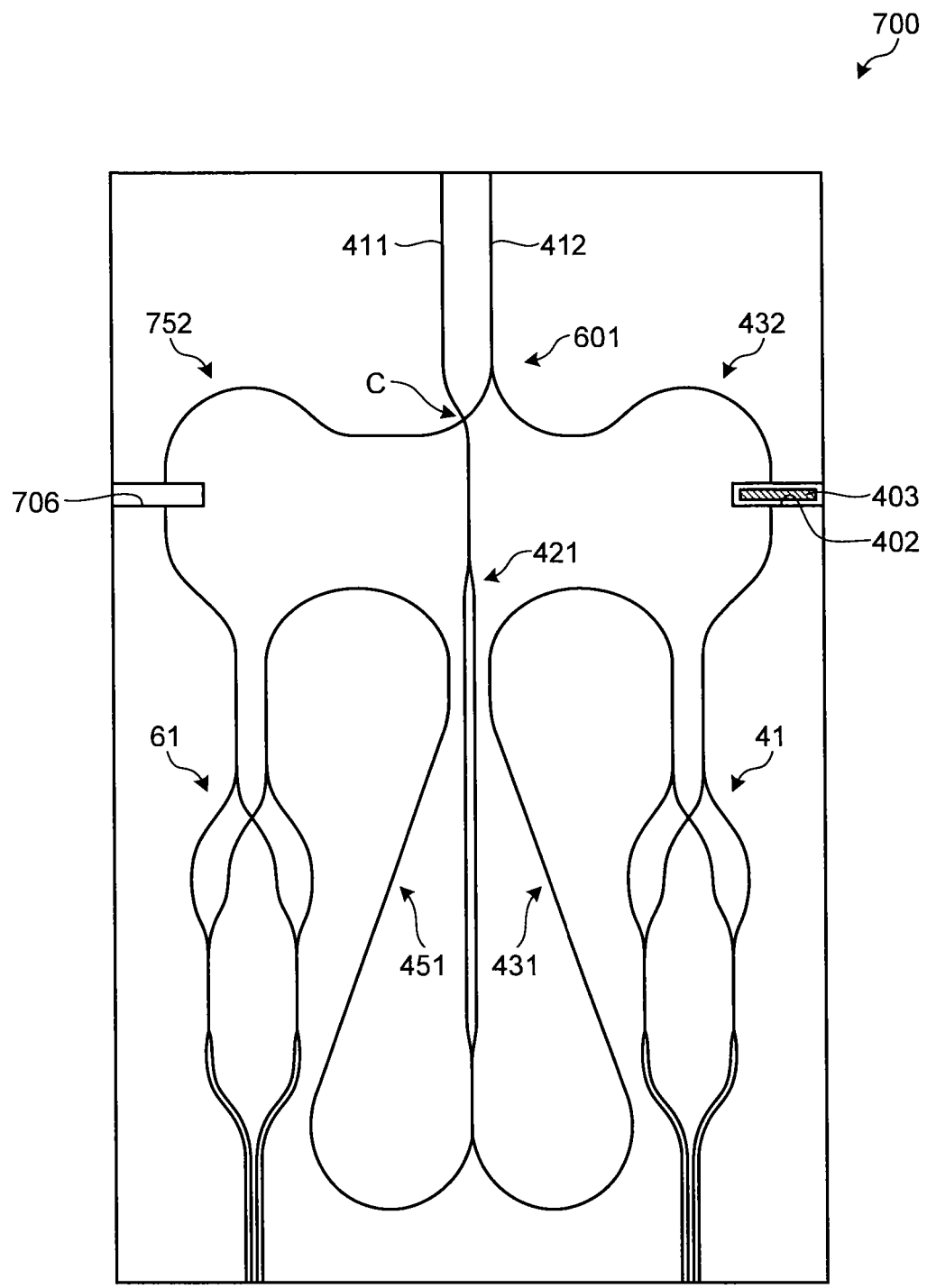
FIG. 14 is a schematic plan view illustrating an optical waveguide circuit according to a seventh embodiment.

Next, a seventh embodiment of the present invention is described. FIG. 14 is a schematic plan view of an optical waveguide circuit according to the seventh embodiment. An optical waveguide circuit 700 has a structure obtained by replacing, in the optical waveguide circuit 600 illustrated in FIG. 13A, the connection optical waveguide 652 with a connection optical waveguide 752.

The connection optical waveguide 752 has a shape in which two S-shapes are continuously connected in the same manner as the connection optical waveguide 652, and a slit 706 serving as the optical loss portion formed so as to separate the connection optical waveguide 752.

In the optical waveguide circuit 700, the radiation loss of the slit 706 is set to a value that compensates the excessive loss difference (the insertion loss of the half-wave plate 403)−(the intersection loss at the intersection C). This setting enables the intensity of the TE polarization LO light input to the 90-degree hybrid element 41 and the intensity of the TM polarization LO light input to the 90-degree hybrid element 61 to be equalized. The radiation loss of the slit 706 can be increased or decreased by widening or narrowing the slit width. The slit width of the slit 706 may be approximately equal to the slit width of the slit 402 in which the half-wave plate 403 is inserted, for example.

Figure 15:
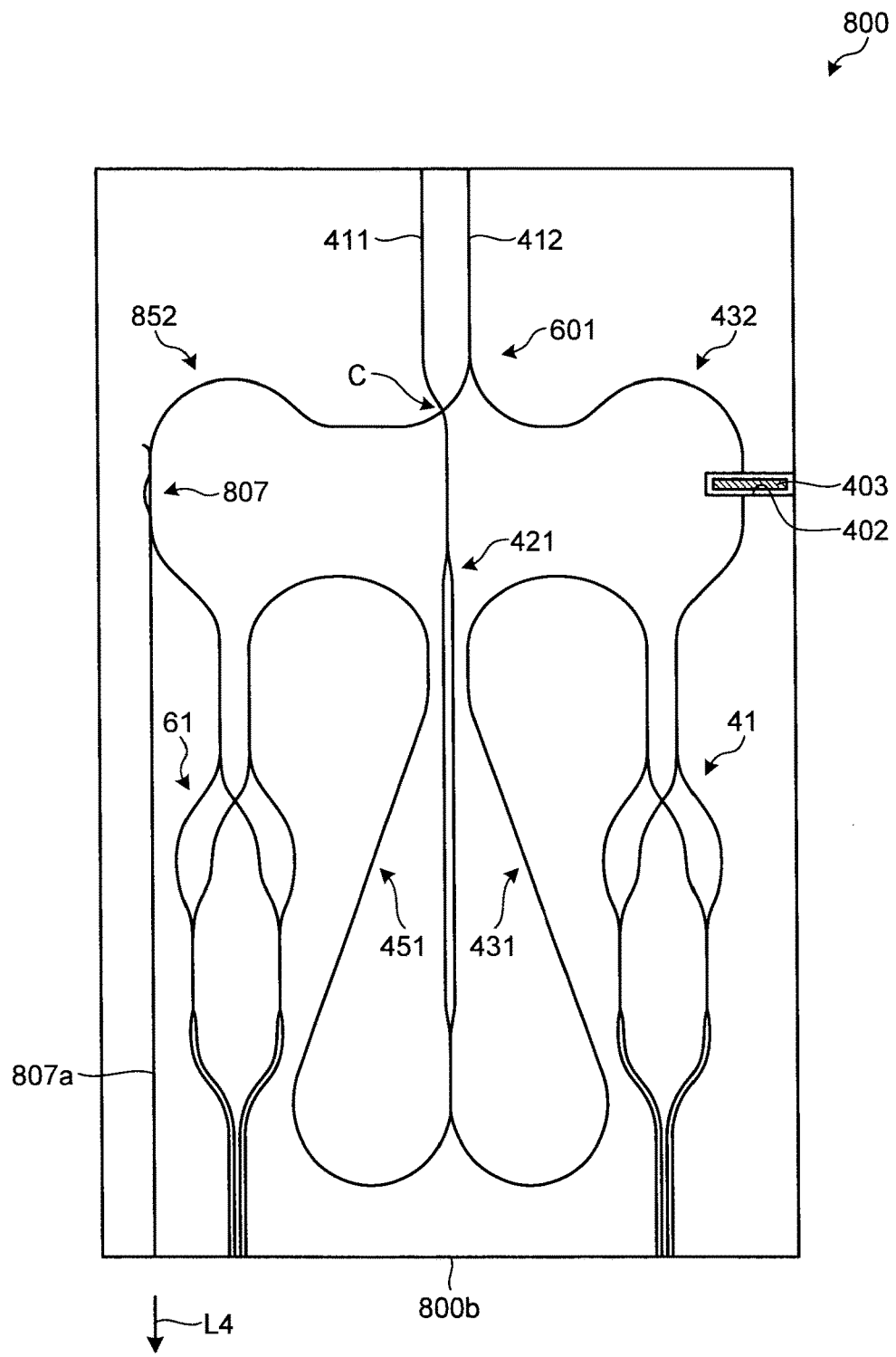
FIG. 15 is a schematic plan view illustrating an optical waveguide circuit according to an eighth embodiment.

Next, an eighth embodiment of the present invention is described. FIG. 15 is a schematic plan view of an optical waveguide circuit according to the eighth embodiment. An optical waveguide circuit 800 has a structure obtained by replacing, in the optical waveguide circuit 700 illustrated in FIG. 14, the connection optical waveguide 752 with a connection optical waveguide 852 and by additionally including a branch optical coupler 807.

The connection optical waveguide 852 has a shape in which two S-shapes are continuously connected in the same manner as the connection optical waveguide 752, and has the branch optical coupler 807 serving as the optical loss portion inserted in the optical waveguide 852. The branch optical coupler 807 has a branch output portion 807a extending to a light output edge face 800b.

In the optical waveguide circuit 800, the insertion loss of the branch optical coupler 807 is set to a value that compensates the excess loss difference (the insertion loss of the half-wave plate 403)−(the intersection loss at the intersection C). This setting enables the intensity of the TE polarized LO light input to the 90-degree hybrid element 41 and the intensity of the TM polarized LO light input to the 90-degree hybrid element 61 to be equalized. The insertion loss of the branch optical coupler 807 can be adjusted by the setting of the branching ratio of the branch optical coupler 807.

Part of the TM polarized LO light guided by the connection optical waveguide 852 is branched by the branch output portion 807a and output from the light output edge face 800b as a monitoring light L4. The insertion loss of the branch optical coupler 807 can be monitored by measuring the intensity of the monitoring light L4.

Figure 16A:
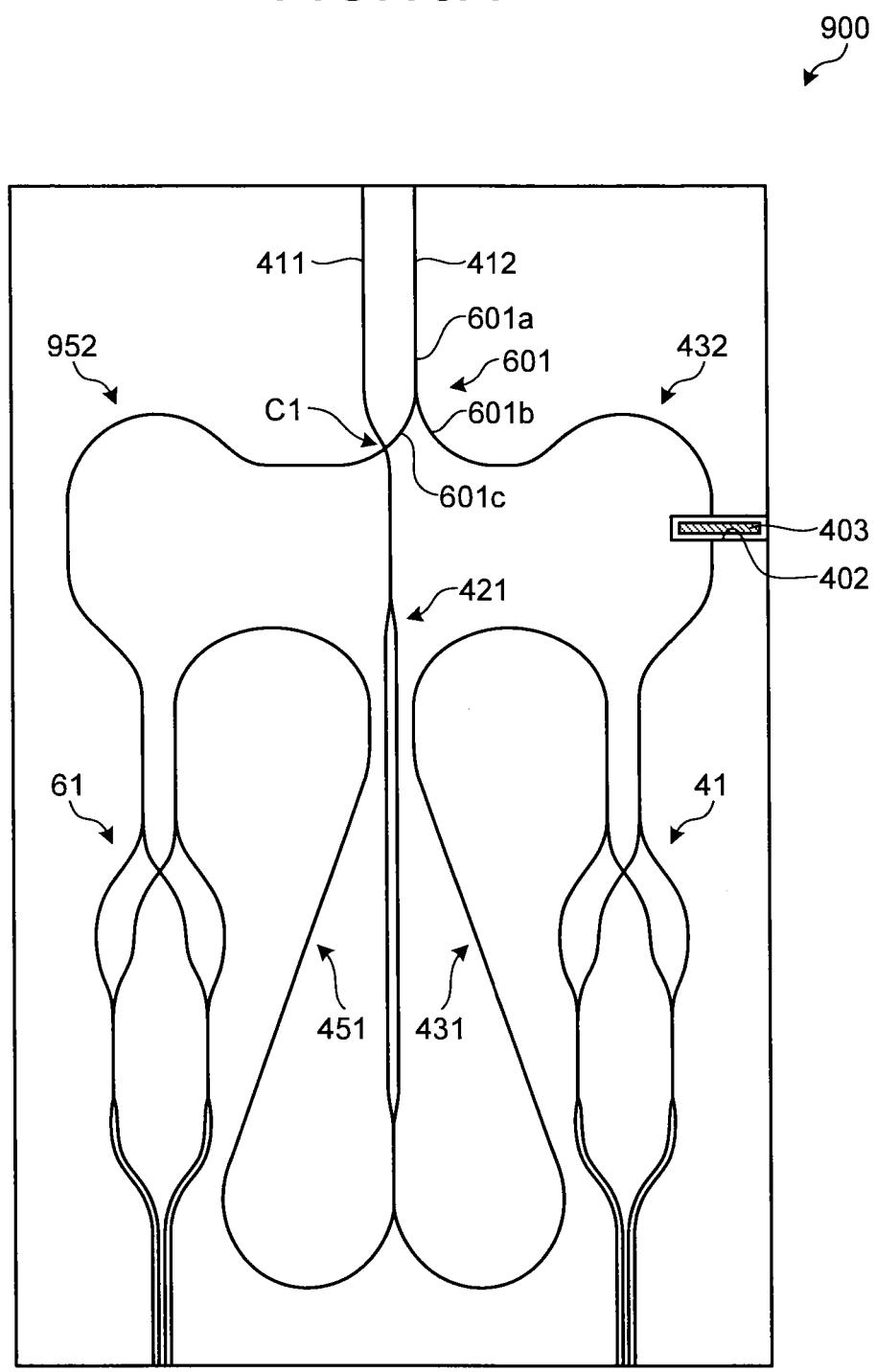
FIG. 16A is a schematic plan view of an optical waveguide circuit according to a ninth embodiment.
Figure 16B:
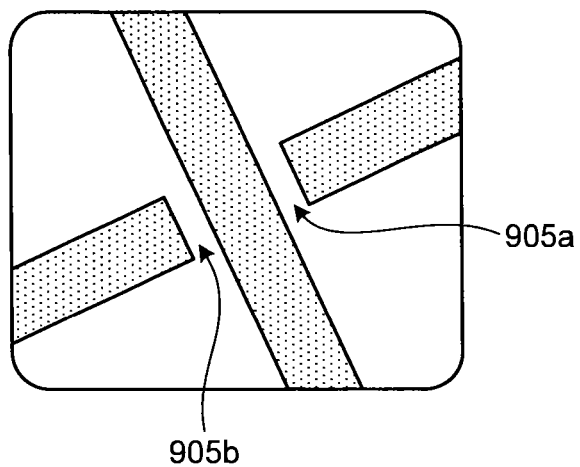
FIG. 16B is a partially enlarged view of the optical waveguide circuit illustrated in FIG. 16A.

Next, a ninth embodiment of the present invention is described. FIG. 16A is a schematic plan view of an optical waveguide circuit according to the ninth embodiment. FIG. 16B is a partially enlarged view of the optical waveguide circuit illustrated in FIG. 16A. An optical waveguide circuit 900 has a structure obtained by replacing, in the optical waveguide circuit 600 illustrated in FIG. 13A, the connection optical waveguide 652 with a connection optical waveguide 952.

The Y-branch optical waveguide 601 includes the input portion 601a, and the output portions 601b and 601c. The input portion 601a connects to the input optical waveguide 412. The branching ratio of the output portions 601b and 601c of the Y-branch optical waveguide 601 is 1:1.

The connection optical waveguide 952 has a shape in which two S-shapes are continuously connected in the same manner as the connection optical waveguide 452, and has gap optical waveguide portions 905a and 905b serving as the optical loss portions, which are the loss compensation mechanisms, at an area of an intersection C1 at which the connection optical waveguide 952 and the input optical waveguide 411 intersect as illustrated in FIG. 16B. The gap optical waveguide portions 905a and 905b are gaps halfway in the optical waveguide and the gaps are filled with silica glass based material the same as that of the cladding layer.

In the optical waveguide circuit 900, the radiation losses of the gap optical waveguide portions 905a and 905b are set to values that compensates the loss difference (the insertion loss of the half-wave plate 403)−(the intersection loss at the intersection C1). This setting enables the intensity of the TE polarized LO light input to the 90-degree hybrid element 41 and the intensity of the TM polarized LO light input to the 90-degree hybrid element 61 to be equalized. The radiation losses of the gap optical waveguide portions 905a and 905b can be increased or decreased by widening or narrowing the gaps.

In addition, in the optical waveguide circuit 900, the width of the input optical waveguide 411 does not change at the intersection C1, thereby enabling the intersection loss taking place at the intersection C1 to be set to a very small loss.

In the above-described embodiments, the Y-branch waveguide is used on the input side and the 3-dB coupler that is the directional coupler (DC) is used on the output side of the polarization beam splitter. An optical coupler such as a known WINC (Wavelength Insensitive Coupler) or a known MMI (Multi-Mode Interferometer) may be used. Any combination such as "directional coupler and directional coupler", "Y-branch and WINC", "WINC and WINC", "Y-branch and MMI", or "MMI and MMI" may be used as the combination of the element on the input side and the element on the output side of the polarization beam splitter. The WINC or the MMI may be also used as the optical coupler used on the output side of the 90-degree hybrid element.

The input optical waveguides in the first and the second embodiments have an approximately straight line shape. The shape, however, may not be a completely straight line and may have such a bend that the bend does not cause the polarization surface of guided light to rotate.

In the above-described embodiments, the optical waveguide circuits are the PBS-integrated coherent mixers. The present invention, however, is not limited to such optical waveguide circuits and can be applied to an optical waveguide circuit including an optical interference element that causes the interference between polarization-split light components.

The above-described embodiments do not limit the present invention. The combinations of the elements of the embodiments are also included in the present invention. For example, the input optical waveguide circuit having the S-shaped bending portion in the third embodiment may be applied to the optical waveguide circuit according to the first embodiment.

As set forth hereinabove, an optical waveguide circuit according to the present invention is suitable for application in optical communications.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An optical waveguide circuit, comprising:
a first and second input optical waveguides to which a first light and a second light are input, respectively;
a first polarization beam splitter that connects to the first input optical waveguide;
an optical interference element that receives one of two polarized light components that are output from the first polarization beam splitter after the first light is polarization-split by the first polarization beam splitter and orthogonal to each other, and one of two polarized light components that are produced from the second light and orthogonal to each other, the optical interference element causing interference between the input two polarized light components;
a first connection optical waveguide that connects the first polarization beam splitter and the optical interference element;
a branch optical waveguide that connects to the second input optical waveguide; and
a second connection optical waveguide that connects the branch optical waveguide and the optical interference element, wherein
a portion of the first input optical waveguide between an input portion into which the first light is input and an input portion of the first polarization beam splitter includes straight lines and a first S-shape, the first S-shape including a first bending portion having a predetermined curvature radius and a predetermined angle of an arc, and a second bending portion having a curvature radius and an angle of an arc set so as to cancel rotation of a polarization surface of light taking place in the first bending portion,
the second input optical waveguide has an approximately straight line shape between an input portion into which the second light is input and the branch optical waveguide,
the first connection optical waveguide is directly connected to an output portion of the first polarization beam splitter and an input portion of the optical interference element,
the first connection optical waveguide has at least a second S-shape between the output portion of the first polarization beam splitter and the input portion of the optical interference element, the second S-shape including a first bending portion having a predetermined curvature radius and a predetermined angle of an arc, and a second bending portion having a curvature radius and an angle of an arc set so as to cancel rotation of a polarization surface of light taking place in the first bending portion,
the second connection optical waveguide has at least a third S-shape between an output portion of the branch optical waveguide and the input portion of the optical interference element, the third S-shape including a first bending portion having a predetermined curvature radius and a predetermined angle of an arc, and a second bending portion having a curvature radius and an angle of an arc set so as to cancel rotation of a polarization surface of light taking place in the first bending portion, and
the first polarization beam splitter, the first connection optical waveguide, and the optical interference element are arranged in a fourth S-shape, the fourth S-shape including a first bending portion having a predetermined curvature radius and a predetermined angle of an arc, and a second bending portion having a curvature radius and an angle of an arc set so as to cancel rotation of a polarization surface of light taking place in the first bending portion,
wherein the first bending portion of the second S-shape and the second bending portion of the second S-shape have curvatures opposite in positive and negative to each other, an identical curvature radius, and an identical angle of the arc.

2. The optical waveguide circuit according to claim 1, further comprising a second polarization beam splitter that is provided between the second input optical waveguide and the second connection optical waveguide and disposed approximately in parallel with the first polarization beam splitter, and that polarization-splits the second light into two polarized light components orthogonal to each other and outputs the two polarized light components.

3. The optical waveguide circuit according to claim 2, wherein the first and the second polarization beam splitters and the optical interference element are arranged parallel in a width direction of the optical waveguide circuit.

4. The optical waveguide circuit according to claim 1, wherein the first polarization beam splitter is structured by a Mach-Zehnder type interferometer.

5. The optical waveguide circuit according to claim 1, wherein the optical interference element is a 90-degree hybrid element.

6. The optical waveguide circuit according to claim 1, comprising:
another optical interference element; and
another first and another second connection optical waveguides connect to the another optical interference element.

7. The optical waveguide circuit according to claim 1, comprising:
another optical interference element; and
another first and another second connection optical waveguides that connect to the another optical interference element, wherein
the branch optical waveguide connects the second input optical waveguide and the another second connection optical waveguide and the second connection optical waveguide; and
a polarization rotation element that is inserted in one of the first and the second connection optical waveguides and rotates a polarization of input light by 90 degrees, wherein
the second connection optical waveguide has a loss compensation mechanism that compensates a difference between an excess loss in the first connection optical waveguide and an excess loss in the second connection optical waveguide.

8. The optical waveguide circuit according to claim 7, wherein the loss compensation mechanism is an optical loss portion formed in the first connection optical waveguide or the second connection optical waveguide in which the polarization rotation element is not inserted.

9. The optical waveguide circuit according to claim 8, wherein the optical loss portion is a gap optical waveguide portion formed in the first connection optical waveguide or the second connection optical waveguide.

10. The optical waveguide circuit according to claim 9, wherein the another second connection optical waveguide intersects the first input optical waveguide and the gap optical waveguide portion is formed in an area at the intersection.

11. The optical waveguide circuit according to claim 8, wherein the optical loss portion is a slit that separates the second connection optical waveguide.

12. The optical waveguide circuit according to claim 8, wherein the optical loss portion is a branch optical coupler inserted in the another second connection optical waveguide.

13. The optical waveguide circuit according to claim 7, wherein the loss compensation mechanism is the branch optical waveguide having a branching ratio that is set so as to compensate the difference in the excess losses.

14. The optical waveguide circuit according to claim 13, wherein the branch optical waveguide is a Y-branch optical waveguide.

15. The optical waveguide circuit according to claim 13, wherein the branch optical waveguide is a Mach-Zehnder interferometer type optical waveguide.

16. The optical waveguide circuit according to claim 15, wherein the branching ratio is adjusted by changing an effective refractive index of at least one arm waveguide of the Mach-Zehnder interferometer type optical waveguide.

* * * * *